(12) United States Patent
Kamiya

(10) Patent No.: US 11,552,827 B2
(45) Date of Patent: Jan. 10, 2023

(54) SIGNAL ESTIMATION APPARATUS, SIGNAL ESTIMATION METHOD AND PROGRAM RECORDING MEDIUM

(71) Applicant: NEC Corporation, Tokyo (JP)

(72) Inventor: Norifumi Kamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/490,278

(22) Filed: Sep. 30, 2021

(65) Prior Publication Data

US 2022/0116244 A1    Apr. 14, 2022

(30) Foreign Application Priority Data

Oct. 6, 2020    (JP) .................. 2020-169209

(51) Int. Cl.
| | |
|---|---|
| *H04L 5/12* | (2006.01) |
| *H04L 25/02* | (2006.01) |
| *H04B 7/06* | (2006.01) |
| *H04B 7/0456* | (2017.01) |

(52) U.S. Cl.
CPC ....... *H04L 25/0202* (2013.01); *H04B 7/0456* (2013.01); *H04B 7/0632* (2013.01); *H04B 7/0639* (2013.01)

(58) Field of Classification Search
CPC .......... H04L 25/0202; H04L 25/03006; H04B 7/0456; H04B 7/0632; H04B 7/0639; H04B 7/0413
USPC ........................................................ 375/262
See application file for complete search history.

(56) References Cited

U.S. PATENT DOCUMENTS

| | | | |
|---|---|---|---|
| 2010/0290552 | A1 | 11/2010 | Sasaki |
| 2016/0149626 | A1* | 5/2016 | Frenne ................. H04B 7/0473 |
| | | | 375/267 |
| 2018/0019835 | A1 | 1/2018 | Kamiya |

FOREIGN PATENT DOCUMENTS

| | | |
|---|---|---|
| JP | 5317021 B2 | 10/2013 |
| JP | 6583292 B2 | 10/2019 |

OTHER PUBLICATIONS

Hirofumi Sasaki et al., "Experiment on Over-100-Gbps Wireless Transmission with OAM-MIMO Multiplexing System in 28-GHz Band", 2018 IEEE Global Communications Conference (GLOBECON), Dec. 2018.
Masashi Hirabe et al., "40m of OAM mode and Polarization Multiplexing in E-band" on IEEE Global Communications Conference (GLOBECON 2019. Dec. 2019.

\* cited by examiner

*Primary Examiner* — Helene E Tayong

(57) ABSTRACT

A signal estimation apparatus classifies reception signal components included in a reception signal y and transmission signal components included in a transmission signal into a plurality of signal groups in accordance with a degree of a correlation between the reception signal component and the transmission signal component, on the basis of system information, sets, for each signal group, parameters $\beta$, $\rho$, $\tau$ and $\eta$ that specifies a detail of a signal estimation method to be either one of a learned value that is learnable by a learning operation and a fixed value that is independent from the learning operation, and estimates, for each signal group, an estimation signal xe that is an estimated value of the transmission signal from the reception signal by using the signal estimation method specified by the set parameter.

11 Claims, 9 Drawing Sheets

$$x = \begin{bmatrix} x[1] \\ x[2] \\ \vdots \\ x[j] \\ \vdots \\ x[M] \end{bmatrix} = \begin{bmatrix} x[1,1] & x[1,2] & \cdots & x[1,t] & \cdots & x[1,N] \\ x[2,1] & x[2,2] & \cdots & x[2,t] & \cdots & x[2,N] \\ \vdots & \vdots & & \vdots & & \vdots \\ x[j,1] & x[j,2] & \cdots & x[j,t] & \cdots & x[j,N] \\ \vdots & \vdots & & \vdots & & \vdots \\ x[M,1] & x[M,2] & \cdots & x[M,t] & \cdots & x[M,N] \end{bmatrix}$$

FIG. 2

$$y = \begin{bmatrix} y[1] \\ y[2] \\ \vdots \\ y[i] \\ \vdots \\ y[M] \end{bmatrix} = \begin{bmatrix} y[1,1] & y[1,2] & \cdots & y[1,s] & \cdots & y[1,N] \\ y[2,1] & y[2,2] & \cdots & y[2,s] & \cdots & y[2,N] \\ \vdots & \vdots & & \vdots & & \vdots \\ y[i,1] & y[i,2] & \cdots & y[i,s] & \cdots & y[i,N] \\ \vdots & \vdots & & \vdots & & \vdots \\ y[M,1] & y[M,2] & \cdots & y[M,s] & \cdots & y[M,N] \end{bmatrix}$$

FIG. 3

$$\begin{bmatrix} y[1] \\ y[2] \\ \vdots \\ y[i] \\ \vdots \\ y[M] \end{bmatrix} = \begin{bmatrix} H[1,1] & H[1,2] & \cdots & H[1,j] & \cdots & H[1,M] \\ H[2,1] & H[2,2] & \cdots & H[2,j] & \cdots & H[2,M] \\ \vdots & \vdots & & \vdots & & \vdots \\ H[i,1] & H[i,2] & \cdots & H[i,j] & \cdots & H[i,M] \\ \vdots & \vdots & & \vdots & & \vdots \\ H[M,1] & H[M,2] & \cdots & H[M,j] & \cdots & H[M,M] \end{bmatrix} \times \begin{bmatrix} x[1] \\ x[2] \\ \vdots \\ x[j] \\ \vdots \\ x[M] \end{bmatrix} + \begin{bmatrix} n[1] \\ n[2] \\ \vdots \\ n[j] \\ \vdots \\ n[M] \end{bmatrix}$$

FIG. 4

$$H[i,j] \quad = \quad F_N \begin{bmatrix} h[i,j]_{1,1} & h[i,j]_{1,2} & \cdots & h[i,j]_{1,t} & \cdots & h[i,j]_{1,N} \\ h[i,j]_{2,1} & h[i,j]_{2,2} & \cdots & h[i,j]_{2,t} & \cdots & h[i,j]_{2,N} \\ \vdots & \vdots & & \vdots & & \vdots \\ h[i,j]_{s,1} & h[i,j]_{s,2} & \cdots & h[i,j]_{s,t} & \cdots & h[i,j]_{s,N} \\ \vdots & \vdots & & \vdots & & \vdots \\ h[i,j]_{N,1} & h[i,j]_{N,2} & \cdots & h[i,j]_{N,t} & \cdots & h[i,j]_{N,N} \end{bmatrix} F_N^{-1}$$

FIG. 7

$$\begin{bmatrix} y[1] \\ y[2] \\ \vdots \\ y[i] \\ \vdots \\ y[M] \end{bmatrix} = \begin{bmatrix} H[1,1] & H[1,2] & \cdots & H[1,j] & \cdots & H[1,M] \\ H[2,1] & H[2,2] & \cdots & H[2,j] & \cdots & H[2,M] \\ \vdots & \vdots & & \vdots & & \vdots \\ H[i,1] & H[i,2] & \cdots & H[i,j] & \cdots & H[i,M] \\ \vdots & \vdots & & \vdots & & \vdots \\ H[M,1] & H[M,2] & \cdots & H[M,j] & \cdots & H[M,M] \end{bmatrix} \times \begin{bmatrix} x[1] \\ x[2] \\ \vdots \\ x[j] \\ \vdots \\ x[M] \end{bmatrix}$$

↓ SORT COMPONENTS ↓ SORT COMPONENTS TO BE BLOCK DIAGONAL MATRIX ↓ SORT COMPONENTS $$\begin{bmatrix} y^{(1)} \\ y^{(2)} \\ \vdots \\ y^{(k)} \\ \vdots \\ y^{(N)} \end{bmatrix} = \begin{bmatrix} H^{(1,1)} & H^{(1,2)} & \cdots & H^{(1,m)} & \cdots & H^{(1,N)} \\ H^{(2,1)} & H^{(2,2)} & \cdots & H^{(2,m)} & \cdots & H^{(2,N)} \\ \vdots & \vdots & & \vdots & & \vdots \\ H^{(k,1)} & H^{(k,2)} & \cdots & H^{(k,m)} & \cdots & H^{(k,N)} \\ \vdots & \vdots & & \vdots & & \vdots \\ H^{(N,1)} & H^{(N,2)} & \cdots & H^{(N,m)} & \cdots & H^{(N,N)} \end{bmatrix} \times \begin{bmatrix} x^{(1)} \\ x^{(2)} \\ \vdots \\ x^{(k)} \\ \vdots \\ x^{(N)} \end{bmatrix}$$

=

$$\begin{bmatrix} y^{(1)} \\ y^{(2)} \\ \vdots \\ y^{(k)} \\ \vdots \\ y^{(N)} \end{bmatrix} = \begin{bmatrix} H^{(1,1)} & 0 & \cdots & 0 \\ 0 & H^{(2,2)} & \cdots & 0 \\ \vdots & \vdots & \ddots & \vdots \\ 0 & 0 & \cdots & H^{(N,N)} \end{bmatrix} \times \begin{bmatrix} x^{(1)} \\ x^{(2)} \\ \vdots \\ x^{(k)} \\ \vdots \\ x^{(N)} \end{bmatrix}$$

FIG. 8

SIGNAL ESTIMATION APPARATUS, SIGNAL ESTIMATION METHOD AND PROGRAM RECORDING MEDIUM

INCORPORATION BY REFERENCE

This application is based upon and claims the benefit of priority from Japanese Patent Application No. 2020-169209, filed on Oct. 6, 2020, the disclosure of which is incorporated herein in its entirety by reference.

TECHNICAL FIELD

The present disclosure relates to a signal estimation apparatus and a signal estimation method that estimate a transmission signal transmitted by a transmission apparatus on the basis of a reception signal received by a reception apparatus, and relates to a program recording medium for performing the signal estimation method described above.

BACKGROUND ART

Recently, research has been carried out on a communication system in which signals are transmitted and received by using an OAM-MIMO (Orbital Angular Momentum-Multiple Input Multiple Output) transmission technology (technique). The OAM-MIMO transmission technology is a transmission technology in which signals multiplexed by using a plurality of radio waves or electric waves of different OAM modes are transmitted from a transmission apparatus including a plurality of antenna elements to a reception apparatus including a plurality of antenna elements. Non-Patent Literature 1 discloses an example of the communication system that employs such an OAM-MIMO transmission technology. Specifically, Non-Patent Literature 1 discloses a communication system in which signals multiplexed by using a plurality of radio waves of different OAM modes are transmitted between a transmission apparatus that is provided with a transmission antenna including a plurality of antenna elements and a reception apparatus that is provided with a reception antenna including a plurality of antenna elements.

In addition, Patent Literature 1 to Patent Literature 2 and Non-Patent Literature 2 are cited as Background Art Documents related to the present disclosure.

CITATION LIST

Patent Literature

[Patent Literature 1] JP6583292B;
[Patent Literature 2] JP5317021B;
[Non-Patent Literature]
[Non-Patent Literature 1] Hirofumi Sasaki et al., "Experiment on Over-100-Gbps Wireless Transmission with OAM-MIMO Multiplexing System in 28-GHz Band", 2018 IEEE Global Communications Conference (GLOBECON), December 2018
[Non-Patent Literature 2] Masashi Hirabe et al., "40m of OAM mode and Polarization Multiplexing in E-band" on IEEE Global Communications Conference (GLOBECON 2019, December 2019.

SUMMARY OF INVENTION

Technical Problem

In the communication system that employs the OAM-MIMO transmission technology, the reception apparatus that receives a transmission signal transmitted by the transmission apparatus as a reception signal estimates the transmission signal on the basis of the reception signal. Typically, the reception apparatus estimates the transmission signal on the basis of a transmission path matrix (in other words, a channel matrix) indicating a state of a transmission path between the transmission apparatus and the reception apparatus, and on the basis of the reception signal.

Here, when the transmission antenna and the reception antenna are arranged in an ideal arrangement aspect (namely, the plurality of antenna elements are arranged in an ideal arrangement aspect), the transmission signal can be estimated with high accuracy by an existing signal estimation method, for example. A signal estimation method based on a Minimum Mean Square Error (MMSE) illustrated by an Equation 1 is one example of the existing signal estimation method. However, in reality, the transmission antenna and the reception antenna are not always arranged in the ideal arrangement aspect. In this case, a general signal estimation method cannot always estimate the transmission signal with high accuracy, which is a technical problem, because a state where the transmission antenna and the reception antenna are not arranged in the ideal arrangement aspect is not considered.

Even in a communication system in which signals multiplexed by using a plurality of radio waves of different OAM modes are transmitted from a transmission apparatus that is provided with a single transmission antenna to a reception apparatus that is provided with a single reception antenna, it is also desired to estimate the transmission signal with high accuracy.

In view of the problems described above, it is therefore an example object of the present disclosure to provide a signal estimation apparatus, a signal estimation method, and a program recording medium that can solve the technical problems described above. By way of example, the example object of the present disclosure is to provide a signal estimation apparatus, a signal estimation method, and a program recording medium that are configured to estimate the transmission signal on the basis of the reception signal with high accuracy.

Solution to Problem

A signal estimation apparatus according to an example aspect of the present disclosure is a signal estimation apparatus that estimates a transmission signal from a reception signal in a communication system, the communication system includes: a transmission apparatus that transmits the transmission signal by using a transmission antenna including a plurality of transmission antenna elements; and a reception apparatus that receives, as the reception signal, the transmission signal transmitted by the transmission apparatus by using a reception antenna including a plurality of reception antenna elements, the signal estimation apparatus includes a controller, the controller is configured to: classify a plurality of reception signal components that are included in the reception signal and that are received by the plurality of reception antenna elements, respectively, and a plurality of transmission signal components that are included in the transmission signal and that are transmitted by the plurality of transmission antenna elements, respectively, into a plurality of signal groups in accordance with a degree of a correlation between the reception signal component and the transmission signal component, on the basis of system information that includes antenna information relating to the transmission antenna and the reception antenna, a distance information relating to a transmission distance between the transmission antenna and the reception antenna, a carrier wave information relating to carrier wave used by the communication system and processing information relating to a signal processing performed by the transmission apparatus and a reception processing performed by the reception apparatus; set, for each signal group, a parameter that specifies a detail of a signal estimation method to be either one of a learned value that is learnable by a learning operation and a fixed value that is independent from the learning operation; and estimate, for each signal group, an estimation signal that is an estimated value of the transmission signal from the reception signal by using the signal estimation method that is specified by the set parameter.

A signal estimation method according to an example aspect of the present disclosure is a signal estimation method that estimates a transmission signal from a reception signal in a communication system, the communication system includes: a transmission apparatus that transmits the transmission signal by using a transmission antenna including a plurality of transmission antenna elements; and a reception apparatus that receives, as the reception signal, the transmission signal transmitted by the transmission apparatus by using a reception antenna including a plurality of reception antenna elements, the signal estimation method includes: classifying a plurality of reception signal components that are included in the reception signal and that are received by the plurality of reception antenna elements, respectively, and a plurality of transmission signal components that are included in the transmission signal and that are transmitted by the plurality of transmission antenna elements, respectively, into a plurality of signal groups that are determined in accordance with a degree of a correlation between the reception signal component and the transmission signal component, on the basis of system information that includes antenna information relating to the transmission antenna and the reception antenna, a distance information relating to a transmission distance between the transmission antenna and the reception antenna, a carrier wave information relating to carrier wave used by the communication system and processing information relating to a signal processing performed by the transmission apparatus and a reception processing performed by the reception apparatus; setting, for each signal group, a parameter that specifies a content of the signal estimation method to be either one of a learned value that is learnable by a learning operation and a fixed value that is independent from the learning operation; and estimating, for each signal group, an estimation signal that is an estimated value of the transmission signal from the reception signal by using the signal estimation method that is specified by the set parameter.

A non-transitory program recording medium according to an example aspect of the present disclosure is a non-transitory program recording medium on which a computer program that allows a computer to execute a signal estimation method is recorded, the signal estimation method is a method that estimates a transmission signal from a reception signal in a communication system, the communication system includes: a transmission apparatus that transmits the transmission signal by using a transmission antenna including a plurality of transmission antenna elements; and a reception apparatus that receives, as the reception signal, the transmission signal transmitted by the transmission apparatus by using a reception antenna including a plurality of reception antenna elements, the signal estimation method includes: classifying a plurality of reception signal components that are included in the reception signal and that are received by the plurality of reception antenna elements, respectively, and a plurality of transmission signal components that are included in the transmission signal and that are transmitted by the plurality of transmission antenna elements, respectively, into a plurality of signal groups that are determined in accordance with a degree of a correlation between the reception signal component and the transmission signal component, on the basis of system information that includes antenna information relating to the transmission antenna and the reception antenna, a distance information relating to a transmission distance between the transmission antenna and the reception antenna, a carrier wave information relating to carrier wave used by the communication system and processing information relating to a signal processing performed by the transmission apparatus and a reception processing performed by the reception apparatus; setting, for each signal group, a parameter that specifies a detail of the signal estimation method to be either one of a learned value that is learnable by a learning operation and a fixed value that is independent from the learning operation; and estimating, for each signal group, an estimation signal that is an estimated value of the transmission signal from the reception signal by using the signal estimation method that is specified by the set parameter.

According to respective example aspects of the signal estimation apparatus, the signal estimation method, and the program recording medium described above, it is possible to estimate the transmission signal on the basis of the reception signal with high accuracy.

BRIEF DESCRIPTION OF THE DRAWINGS

FIG. 2 is a vector that illustrates a transmission signal transmitted by a transmission apparatus.

FIG. 3 is a vector that illustrates a reception signal received by a reception apparatus.

FIG. 4 is a diagram that illustrates a relationship between the transmission signal and the reception signal.

FIG. 7 illustrates a submatrix of a transmission path matrix;

FIG. 8 illustrates a method of permutating matrix components of the transmission path matrix;

EXAMPLE EMBODIMENTS

In the below described description, with reference to the drawings, an example embodiment of a signal estimation apparatus, a signal estimation method, and a program recording medium will be described by using a communication system SYS to which the example embodiment of the signal estimation apparatus, the signal estimation method, and the program recording medium are applied. The present invention, however, is not limited to the example embodiment described below.

<1> Configuration of Communication System SYS

Figure 1:
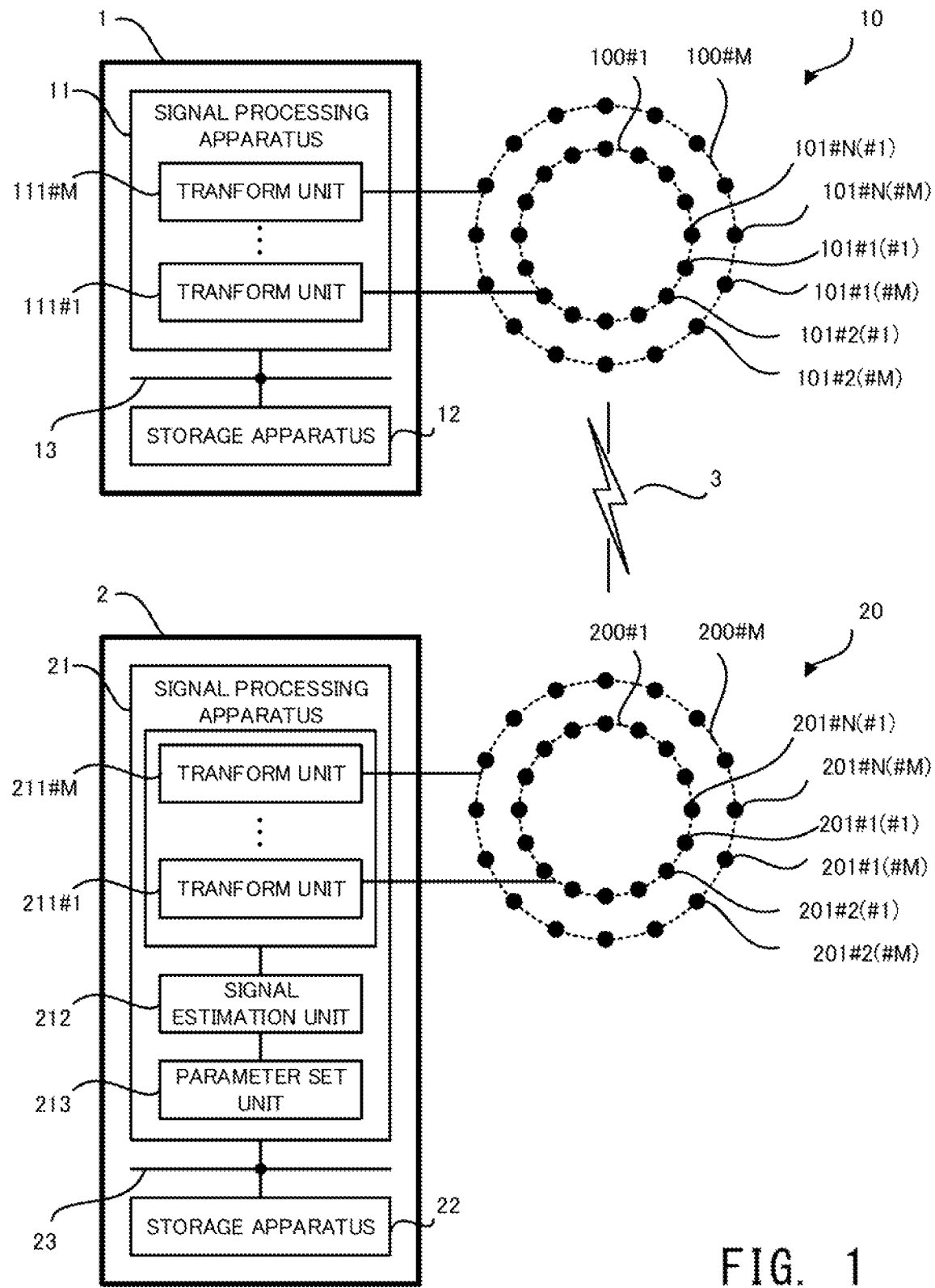
FIG. 1 is a block diagram that illustrates a configuration of a communication system according to an example embodiment.

Firstly, a configuration of the communication system SYS according to an example embodiment will be described with reference to FIG. 1. FIG. 1 is a block diagram illustrating the configuration of the communication system SYS according to the example embodiment.

As illustrated in FIG. 1, the communication system SYS is provided with a transmission apparatus 1 and a reception apparatus 2. The transmission apparatus 1 transmits a transmission signal x to the reception apparatus 2 through a transmission path 3. The reception apparatus 2 receives, as a reception signal y, the transmission signal x transmitted by the transmission apparatus 1 through the transmission path 3. The transmission path 3 may include a wired transmission path (namely, a wired communication network). The transmission path 3 may include a wireless transmission path (namely, a wireless communication network).

The transmission apparatus 1 transmits the transmission signal x by using an OAM (Orbital Angular Momentum) transmission technology (technique). The OAM transmission technology is a technology for transmitting signals multiplexed by using a plurality of radio waves or electric waves of different OAM modes from the transmission apparatus 1 to the reception apparatus 2. In order to transmit the transmission signal x by using OAM transmission technology, the transmission apparatus 1 is provided with a transmission antenna 10, a signal processing apparatus 11, and a storage apparatus 12. The signal processing apparatus 11 and the storage apparatus 12 may be connected through a data bus 13.

The transmission antenna 10 includes a plurality of array antennas 100. FIG. 1 illustrates an example in which the plurality of array antennas 100 are a plurality of circular array antennas (UCAs: Uniform Circular Arrays) diameters of which are different from each other and that are arranged concentrically. Thus, in the example illustrated in FIG. 1, the plurality of array antennas 100 are arranged such that the array antennas 100#1 to 100#M are arranged in this order from the center to the outside. Each array antenna 100 includes a plurality of antenna elements 101. In the below described description, it is assumed that the transmission antenna 10 includes M (wherein M is a constant number representing an integer that is equal to or larger than 1) array antennas 100 (specifically, the array antennas 100#1 to 100#M). Incidentally, when the transmission antenna 10 includes two or more array antennas 100 (furthermore, a below described reception antenna 20 includes two or more array antennas 200), the OAM transmission technology may be referred to as an OAM-MIMO (Multiple Input Multiple Output) transmission technology. In the example illustrated in FIG. 1, it is assumed that each array antenna 100 includes N antenna elements 101 (specifically, antenna elements 101#1 to 101#N) (wherein N is a constant number representing an integer that is equal to or larger than 2) that are arranged at equal intervals in a circular. Note that the antenna elements 101#1 to 101#N of the array antenna 100#j are respectively referred to as antenna elements 101#1(#j) to 101#N (#j) (wherein j is a variable number representing an integer that is equal to or larger than 1 and that is equal to or smaller than M).

Radio waves of different OAM modes in the same frequency band are allocated to the N antenna elements 101 of each array antenna 100. Namely, in the example embodiment, the transmission apparatus 1 multiplexes the transmission signal x by using N OAM modes. In this case, each array antenna 100 is configured to transmit the transmission signal x by using the N antenna elements 101 by a unit of N transmission signal groups that corresponds to the N OAM modes, respectively. However, the radio waves of the same OAM mode may be allocated to at least two antenna elements 101 of each circular array antenna 100. Namely, the number of the OAM modes may be less than the number of the antenna elements 101 of each array antenna 100.

In addition, since the transmission antenna 10 includes the M array antennas 100, the N transmission signal sets may contain M transmission signal components. Therefore, the transmission apparatus 1 is allowed to transmit the transmission signal (namely, a transmission signal sequence) x containing at most M×N transmission signal components multiplexed. In the below described description, a transmission signal component transmitted by a "t"-th antenna element 101#t(#j) of the array antenna 100#j is referred to as a "transmission signal x[j,t]" (wherein t is a variable number representing an integer that is equal to or larger than 1 and that is equal to or smaller than N). In this case, the transmission signal x can be represented by a vector illustrated in FIG. 2. In FIG. 2, a "transmission signal x[j]" includes N transmission signals x[j,1] to x[j,N] that are transmitted by N antenna elements 101 of the array antenna 100#j. Note that initial values of the variable numbers (for example, the variable number t described in this paragraph) and an index are set to 1 in the example embodiment, when there is no specific notation.

The signal processing apparatus 11 may include at least one of a CPU (Central Processing Unit), a GPU (Graphic Processing Unit) and a FPGA (Field Programmable Gate Array). The signal processing apparatus 11 may read a computer program. For example, the signal processing apparatus 11 may read a computer program stored in the storage apparatus 12. For example, the signal processing apparatus 11 may read a computer program stored in a computer-readable recording medium, by using a not-illustrated recording medium reading apparatus. The signal processing apparatus 11 may obtain (namely, may download or read) a computer program from a not-illustrated apparatus disposed outside the transmission apparatus 1, through a not-illustrated communication apparatus. The signal processing apparatus 11 executes the read computer program. As a result, a logical function block(s) for performing an operation to be performed by the transmission apparatus 1 is realized in the signal processing apparatus 11. Specifically, a logical function block(s) for performing a transmission operation of transmitting the transmission signal x is realized in the signal processing apparatus 11. In other words, the signal processing apparatus 11 is configured to function as a controller for realizing the logical function block(s) for performing the operation to be performed by the transmission apparatus 1.

FIG. 1 illustrates an example of the logical function block(s) realized in the signal processing apparatus 11 for performing the transmission operation. As illustrated in FIG. 1, M transform units 111 (specifically, transform units 111#1 to 111#M) are realized in the signal processing apparatus 11.

Each transform unit 111#j performs a preprocessing (a signal processing) on the N transmission signals x[j,1] to x[j,N] that are transmitted by one array antenna 100#j of the M array antennas 100 that corresponds to each transform unit 111#j. In the example embodiment, each transform unit 111#j performs an inverse discrete Fourier transform (IDFT) processing on the N transmission signals x[j,1] to x[j,N]. In this case, each transform unit 111#j may include an inverse discrete Fourier transform unit the length of which is N and that performs the inverse discrete Fourier transform processing by using a Fourier transform matrix $F_N$ having a size of N rows×N columns. The inverse discrete Fourier transform processing may be at least a part of a processing for OAM-multiplexing the N transmission signals x[j,1] to x[j,N]. Namely, the signal processing apparatus 11 may OAM-multiplex the transmission signal x by dividing the transmission signal x including the M×N transmission signals x[1,1] to x[M,N] into M signal sequences x[j] each of which includes the N transmission signals x[j,1] to x[j,N], and by performing the inverse discrete Fourier transform processing on each of the M signal sequences x[j]. The N transmission signals x[j,1] to x[j,N] on which the inverse discrete Fourier transform processing is performed are transmitted to the reception apparatus 2 by the corresponding array antenna 100#j. In the below described description, the N transmission signals x[j,1] to x[j,N] on which the inverse discrete Fourier transform processing is performed are referred to as "transmission signals x'[j,1] to x'[j,1\1]", thereby to distinguish them from the N transmission signals x[j,1] to x[j,N] on which the inverse discrete Fourier transform processing is not performed.

The storage apparatus 12 is configured to store desired data. For example, the storage apparatus 12 may temporarily store a computer program to be executed by the signal processing apparatus 11. The storage apparatus 12 may temporarily store the data that are temporarily used by the signal processing apparatus 11 when the signal processing apparatus 11 executes the computer program. The storage apparatus 12 may store the data that are stored for a long term by the transmission apparatus 1. The storage apparatus 12 may include at least one of a RAM (Random Access Memory), a ROM (Read Only Memory), a hard disk device, a magneto-optical disk device, an SSD (Solid State Drive) and a disk array device.

Next, the reception apparatus 2 is provided with a reception antenna 20, a signal processing apparatus 21, and a storage apparatus 22. The signal processing apparatus 21 and the storage apparatus 22 may be connected through a data bus 23.

The reception antenna 20 is an antenna for receiving, as the reception signal y, the transmission signal x transmitted by using the OAM transmission technology. In the example embodiment, the reception antenna 20 includes a plurality of array antennas 200. FIG. 1 illustrates an example in which the plurality of array antennas 200 are a plurality of circular array antennas (UCAs: Uniform Circular Arrays) diameters of which are different from each other and that are arranged concentrically. Thus, in the example illustrated in FIG. 1, the plurality of array antennas 200 are arranged such that the array antennas 200#1 to 200#M are arranged in this order from the center to the outside. In the below described description, an example in which the reception antenna 20 includes M array antennas 200 (specifically, array antennas 200#1 to 200#M) will be described. Namely, in the below described description, an example in which the number of the array antenna 200 of the reception antenna 20 is equal to the number of the array antenna 100 of the transmission antenna 10 will be described. However, the number of the array antenna 200 of the reception antenna 20 may be different from the number of the array antenna 100 of the transmission antenna 10. Each array antenna 200 includes a plurality of antenna elements 201. In the example illustrated in FIG. 1, each array antenna 200 includes N antenna elements 201 (specifically, antenna elements 201#1 to 201#N) that are arranged at equal intervals in a circular. Namely, in the below described description, an example in which the number of the antenna element 201 of the array antenna 200 is equal to the number of the antenna element 101 of the array antenna 100 will be described. However, the number of the antenna element 201 of the array antenna 200 may be different from the number of the antenna element 101 of the array antenna 100. Note that the antenna elements 201#1 to 201#N of the array antenna 200#i are respectively referred to as antenna elements 201#1(#i) to 201#N (#i) (wherein i is a variable number representing an integer that is equal to or larger than 1 and that is equal to or smaller than M).

As described above, the transmission apparatus 1 transmits the transmission signal (namely, the transmission signal sequence) x in which at most M×N transmission signal components are multiplexed. Thus, the reception apparatus 2 receives, as the reception signal y, the transmission signal x in which at most M×N transmission signal components are multiplexed. In this case, the reception signal y is a signal in which at most M×N reception signal components are multiplexed. In the below described description, a reception signal component received by a "s"-th antenna element 201#s(#i) of the array antenna 200#i is referred to as a "reception signal y[i,s]" (wherein s is a variable number representing an integer that is equal to or larger than 1 and that is equal to or smaller than N). For example, the array antenna 201#i may receive, as the reception signals y[i,1] to y[i,N], the N transmission signals x'[i,1] to x'[i,N] transmitted by one array antenna 100#i corresponding to the array antenna 200#i by using the N antenna elements 201#1(#i) to 202#N(#i). Typically, the antennal element 201#s of the array antenna 200#i may receive, as the reception signal y[i,s], the transmission signal x'[i,s] transmitted by the antenna element 101#s(#i) of the array antenna 100#i. Thus, the reception signal y can be represented by a vector illustrated in FIG. 3. In FIG. 3, a "reception signal y[i]" includes N reception signals y[i,1] to y[i,N] that are received by N antenna elements 201 of the array antenna 200#i.

The signal processing apparatus 21 may include at least one of a CPU, a GPU, and a FPGA. The signal processing apparatus 21 reads a computer program. For example, the signal processing apparatus 21 may read a computer program stored in the storage apparatus 22. For example, the signal processing apparatus 21 may read a computer program stored in a computer-readable recording medium, by using a not-illustrated recording medium reading apparatus. The signal processing apparatus 21 may obtain (i.e., may download or read) a computer program from a not-illustrated apparatus disposed outside the reception apparatus 2, through a not-illustrated communication apparatus. The signal processing apparatus 21 executes the read computer program. As a result, a logical function block(s) for performing an operation to be performed by the reception apparatus 2 is realized in the signal processing apparatus 21. Specifically, a logical function block(s) for performing a reception operation of receiving the reception signal y is realized in the signal processing apparatus 21. In other words, the signal processing apparatus 21 is configured to function as a controller for realizing the logical function block(s) for performing the operation to be performed by the reception apparatus 2.

FIG. 1 illustrates an example of the logical function block(s) realized in the signal processing apparatus 21 for performing the reception operation. As illustrated in FIG. 1, M transform units 211 (specifically, transform units 211#1 to 211#M), a signal estimation unit 212 and a parameter set unit 213 are realized in the signal processing apparatus 21.

Each transform unit 211#*i* performs a preprocessing (a signal processing) on the N reception signals y[i,1] to y[i,N] received by one array antenna 200#*i* of the M array antenna 200 that corresponds to each transform unit 211#*i*. In the example embodiment, each transform unit 211#*i* performs a discrete Fourier transform (DFT) processing on the N reception signals y[i,1] to y[i,N]. In this case, each transform unit 211#*i* may include a discrete Fourier transform unit the length of which is N and that performs the discrete Fourier transform processing by using the Fourier transform matrix $F_N$ having the size of N rows×N columns. The discrete Fourier transform processing may be at least a part of a processing for separating the N reception signals y[i,1] to y[i,N] that are OAM-multiplexed. That is, the signal processing apparatus 21 divides the reception signal y including M×N reception signals $y^{(k)}_{(p)}$ into M signal sequences each of which includes the N reception signals $y^{(0)}_{(p)}$ to $y^{(N-1)}_{(p)}$ and performs the discrete Fourier transform process on each of the M signal sequences. Namely, the signal processing apparatus 21 divides the reception signal y including the M×N reception signals y[1,1] to y[M,N] into M signal sequences y[i] each of which includes the N reception signals y[i,1] to y[i,N], and performs the discrete Fourier transform process on each of the M signal sequences y[i]. In other words, the signal processing apparatus 21 performs the discrete Fourier transform process on the reception signal y including the M×N reception signals y[1,1] to y[M,N], by a unit of M signal sequences y[i] each of which includes the N reception signals y[i,1] to y[i,N]. The reception signal y on which the Fourier transform processing is performed (namely, the reception signal y including the M×N reception signals y[1,1] to y[M,N] on which the Fourier transform processing is performed) is outputted to the signal estimation unit 212. In the below described description, it is assumed that the "reception signal y (including the reception signal y[i,s] and the reception signal y[i])" mean the reception signal on which the Fourier transform processing is performed, when there is no specific notation.

The signal estimation unit 212 estimates the transmission signal x on the basis of the reception signal y including the M×N reception signals y[1,1] to y[M,N] outputted from the M transform units 211. Specifically, the signal estimation unit 212 estimates M×N estimation signals x_estimate[1,1] to x estimate[M,N], which are estimated values of the M×N transmission signals x[1,1] to x[M,N] included in the transmission signal x, on the basis of the reception signal y. Namely, the signal estimation unit 212 estimates an estimation signal x_estimate including the M×N estimation signals x_estimate[1,1] to x_estimate[M,N] on the basis of the reception signal y. The signal estimation unit 212 estimates the estimation signal xe_estimate including an estimation signal x_estimate[j], which is estimated value of the transmission signal x[j] included in the transmission signal x, on the basis of the reception signal y. The signal estimation unit 212 estimates the estimation signal xe_estimate including the N estimation signals x_estimate[0] to x_estimate[j,N], which are estimated values of the N transmission signals x[j,1] to x[j,N] included in the transmission signal x, on the basis of the reception signal y. In the below described description, the "estimated signal x_estimate" is referred to as an "estimated signal xe" for ease of explanation.

Here, a relationship between the transmission signal x and the reception signal y is a relationship illustrated in FIG. 4. As illustrated in FIG. 4, the reception signal y is theoretically (in other words, ideally) equal to a signal that is obtained by adding a noise n to a value obtained by multiplying the transmission signal x by a transmission path matrix H. The transmission path matrix is a channel matrix that indicates a state (typically, a transmission state) of the transmission path 3 between the transmission antenna 10 and the reception antenna 20. The transmission path matrix H is a block matrix that has a size of MN rows×MN columns and that contains a submatrix H[i,j] having a size of N rows×N columns as an (i, j) component (an (i,j) matrix component). The submatrix H[i,j] indicates a state of the transmission path 3 between the array antenna 100#*j* of the transmission antenna 10 and the array antenna 200#*i* of the reception antenna 20. Moreover, "n[j]" in FIG. 4 illustrates a vector containing, as a vector component, noise (for example, white noise) generated in the signal received by the array antenna 200#*j* in the transmission path 3.

A signal estimation method based on a Minimum Mean Square Error (MMSE) is one example of the signal estimation method for estimating the transmission signal x on the basis of the reception signal y. The signal estimation method based on the Minimum Mean Square Error is a method of estimating the transmission signal x by using the Equation 1. Note that "H†" in the Equation 1 denotes a conjugate transpose matrix of the transmission path matrix H, "σ[i]" in the Equation 1 denotes a vector containing N parameters "σ[i,1], σ[i,1], . . . , and σ[i,N] that represent SNR (Signal to Noise Ratio) in the N reception signals y[i,1] to y[i,N] included in the reception signal y[i]. "D(σ[1], σ[2] , . . . , σ[M])" in the Equation 1 denotes a diagonal matrix that has a size of the MN rows×MN columns and that contains, as diagonal matrix components, the parameters "σ[1], σ[2], . . . , σ[M]" representing the M×N Signal to Noise Ratios.

$$xe = (xe[1], xe[2], \ldots xe[M])^T = (H^\dagger H + D(\sigma[1], \sigma[2], \ldots, \sigma[M]))^{-1} H^\dagger (y[1], y[2], \ldots y[M]))^T \quad \text{[Equation 1]}$$

Here, when the transmission antenna 10 and the reception antenna 20 are arranged in an ideal arrangement aspect and the plurality of antenna elements 101 and the plurality of antenna elements 201 are arranged in an ideal arrangement aspect, the transmission signal x can be estimated accurately from the reception signal y by the signal estimation method based on the Minimum Mean Square Error. Note that an arrangement aspect in which the transmission antenna 10 and the reception antenna 20 are arranged axisymmetrically (namely, coaxially) is one example of the ideal arrangement aspect.

However, in reality, the transmission antenna 10 and the reception antenna 20 are not always arranged in the ideal arrangement aspect. For example, when the arrangement position of at least a part of the transmission antenna 10 and the reception antenna 20 is changed due to wind and rain, the transmission antenna 10 and the reception antenna 20 are not always axisymmetric. In this case, a general signal estimation method cannot always estimate the transmission signal x with high accuracy, because a state where the transmission antenna 10 and the reception antenna 20 are not arranged in the ideal arrangement aspect is not considered.

Thus, in the example embodiment, the signal estimation unit 212 employs anew signal estimation method as proposed below in order to estimate the transmission signal x.

Specifically, the signal estimation unit 212 estimates the transmission signal x by using a signal estimation method a detail of which is specified (in other words, a detail of which is changeable) by a parameter set by the parameter set unit 213. Especially, in the below described description, the signal estimation unit 212 estimates the transmission signal x by using a signal estimation method a detail of which is specified by an arithmetic equation (namely, a mathematical equation) including, as a coefficient, the parameter set by the parameter set unit 213. The parameter set by the parameter set unit 213 learned by a learning operation, if needed, as described later. As a result, the signal estimation unit 212 is capable of appropriately estimating the transmission signal x more accurately than the signal estimation method based on the Minimum Mean Square Error, even in the case where the transmission antenna 10 and the reception antenna 20 are not always arranged in the ideal arrangement aspect.

The parameter set unit 213 sets the parameter that specifies the detail of the signal estimation method (the detail of the arithmetic equation in the example embodiment) that is used to estimate the estimation signal xe by the signal estimation unit 212. In the example embodiment, an example in which the parameter set unit 213 sets four types of parameters will be described. Namely, in the example embodiment, an example in which the detail of the signal estimation method that is used to estimate the estimation signal xe by the signal estimation unit 212 is specified by the four types of parameters will be described. In other words, in the example embodiment, an example in which the detail of the signal estimation method that is used to estimate the estimation signal xe by the signal estimation unit 212 is changeable by the four types of parameters will be described. Specifically, the parameter set unit 213 sets, as the four types of parameters, a parameter $\beta$, a parameter $\rho$, a parameter $\tau$ and a parameter $\eta$. The parameter $\beta$ includes N×R parameters $\beta_1^{(1)}$ to $\beta_R^{(N)}$ (R is a constant number representing an integer that is equal to or later than 1). Note that N×R parameters $\beta_1^{(1)}$ to $\beta_R^{(N)}$ are referred to as parameters $\beta_r^{(k)}$ by using a variable number k and a variable number r in the below described description. Each parameter $\beta_r^{(k)}$ is a vector that includes a M-dimensional vector component. The variable number k represents an integer that is equal to or later than 1 and that is equal to or smaller than N. The variable number r represents an integer that is equal to or later than 1 and that is equal to or smaller than R. Moreover, the parameter $\rho$ includes N×R parameters $\rho_1^{(1)}$ to $\rho_R^{(N)}$. Note that N×R parameters $\rho_1^{(1)}$ to $\rho_R^{(N)}$ are referred to as parameters $\rho_r^{(k)}$ by using the variable number k and the variable number r in the below described description. Each parameter $\rho_r^{(k)}$ is a vector that includes a M-dimensional vector component. Moreover, the parameter $\tau$ includes N×R parameters $\tau_1^{(1)}$ to $\tau_R^{(N)}$. Note that N×R parameters $\tau_1^{(1)}$ to $\tau_R^{(N)}$ are referred to as parameters $\tau_r^{(k)}$ by using the variable number k and the variable number r in the below described description. Each parameter $\tau_r^{(k)}$ is a vector that includes a M-dimensional vector component. Moreover, the parameter $\eta$ includes N×R parameters $\eta_1^{(1)}$ to $\eta_R^{(N)}$. Note that N×R parameters $\eta_1^{(1)}$ to $\eta_R^{(N)}$ are referred to as parameters $\eta_r^{(k)}$ by using the variable number k and the variable number r in the below described description. Each parameter $\eta_r^{(k)}$ is a vector that includes a M-dimensional vector component.

Figure 5:
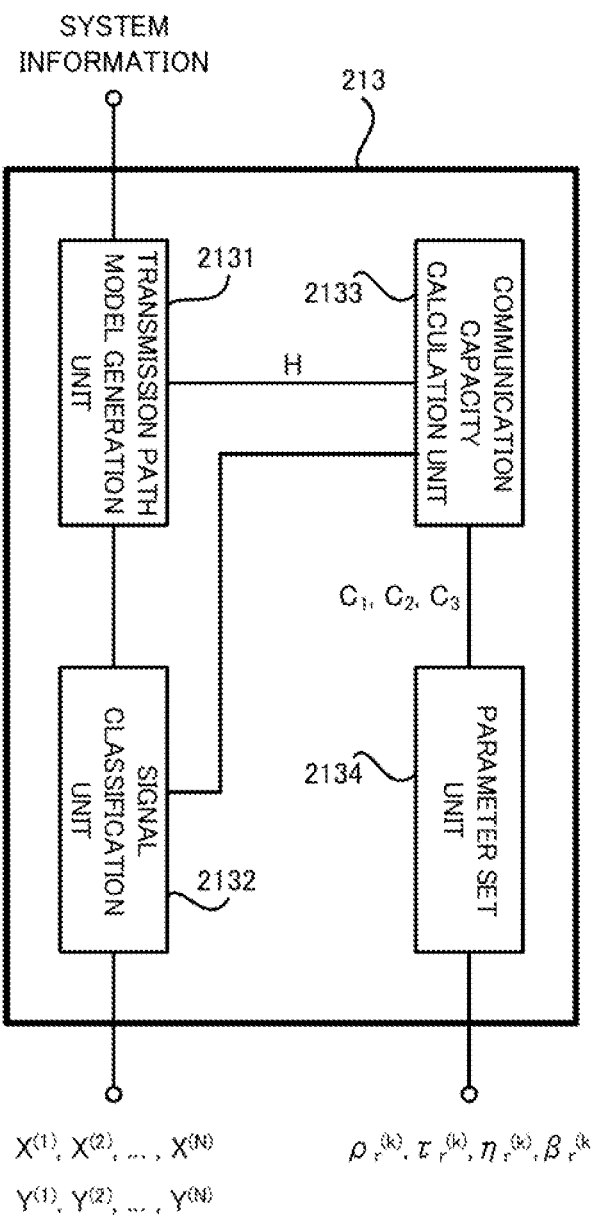
FIG. 5 is a block diagram that illustrates a configuration of a parameter set unit.

A configuration of the parameter set unit 213 is illustrated in FIG. 5. As illustrated in FIG. 5, the parameter set unit 213 is provided with a transmission path model generation unit 2131, a signal classification unit 2132, a communication capacity calculation unit 2133 and a parameter set unit 2134. Note that operations of the transmission path model generation unit 2131, the signal classification unit 2132, the communication capacity calculation unit 2133 and the parameter set unit 2134 will be described later in detail and the description thereof is omitted here.

The storage apparatus 22 is configured to store desired data. For example, the storage apparatus 22 may temporarily store a computer program to be executed by the signal processing apparatus 21. The storage apparatus 22 may temporarily store the data that are temporarily used by the signal processing apparatus 21 when the signal processing apparatus 21 executes the computer program. The storage apparatus 22 may store the data that are stored for a long term by the receiving apparatus 2. The storage apparatus 22 may include at least one of a RAM, a ROM, a hard disk device, a magneto-optical disk device, an SSD, and a disk array device.

<2> Operation of Communication System SYS

Next, the operation of the communication system SYS will be described. As described above, the communication system SYS performs a signal estimation operation for estimating the estimation signal xe from the reception signal y by mainly using the signal estimation unit 213. Moreover, the communication system SYS performs a parameter set operation for setting the parameters $\beta$, $\rho$, $\tau$ and $\eta$ that specify the detail of the signal estimation method that is used to estimate the estimation signal xe from the reception signal y by the signal estimation unit 212. Thus, in the below described description, the parameter set operation and the signal estimation operation will be described in sequence.

<2-1> Parameter Set Operation performed by Parameter Set Unit 213

Figure 6:
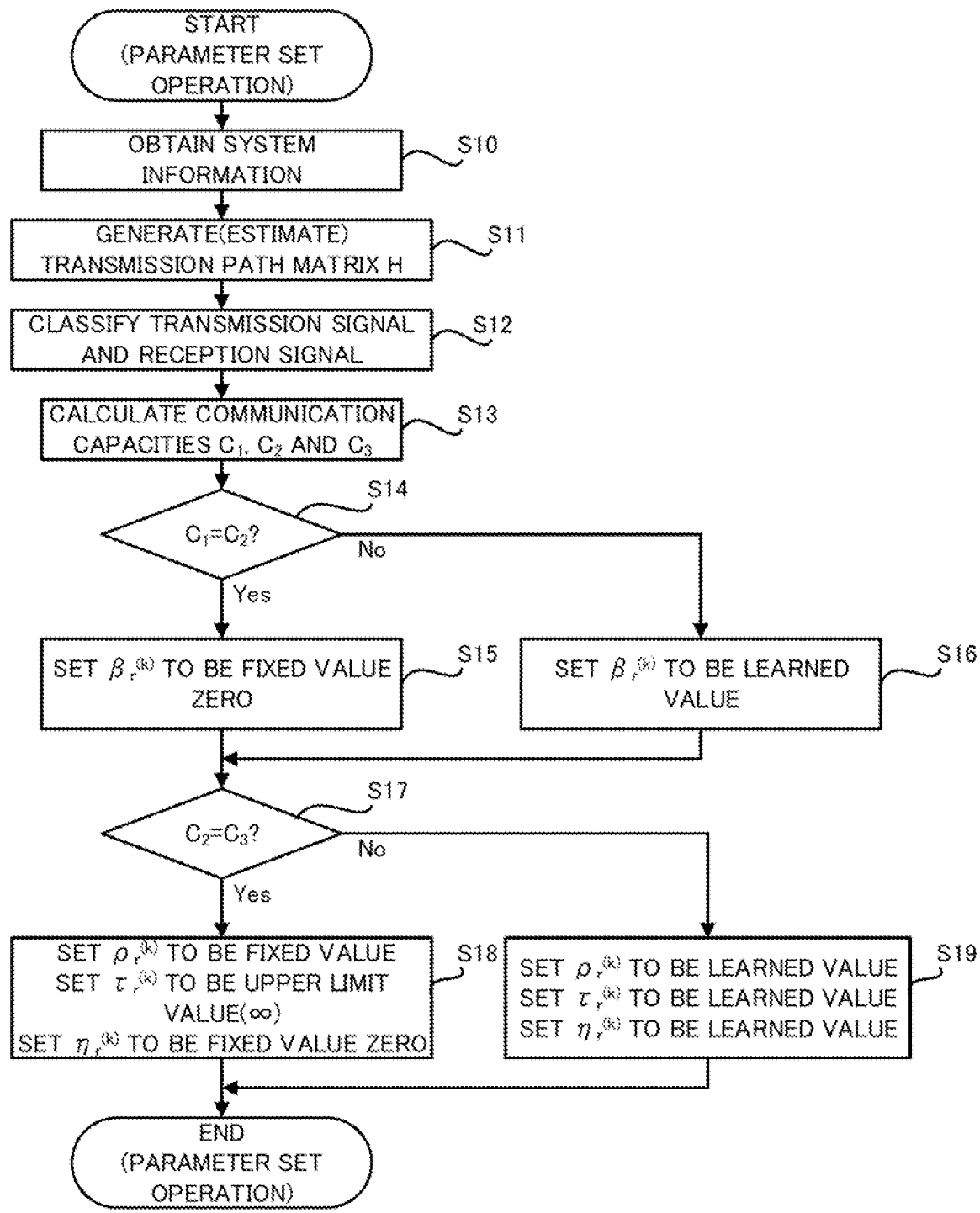
FIG. 6 is a flowchart that illustrates a flow of a parameter set operations performed by the parameter set unit.

Firstly, with reference to FIG. 6, the parameter set operation performed by the parameter set unit 213 will be described. FIG. 6 is a flowchart that illustrates a flow of the parameter set operation performed by the parameter set unit 213.

As illustrated in FIG. 6, firstly, the transmission path model generation unit 2131 obtains system information (a step S10). The system information includes basic information of the communication system SYS. For example, the system information may include antenna information relating to the transmission antenna 10 and the reception antenna 20. The antenna information may include information relating to the number of the array antenna 100 of the transmission antenna 10 (the above described constant number M in the example embodiment) and the number of the antenna element 101 of the array antenna 100 (the above described constant number N in the example embodiment). The antenna information may include information relating to the number of the array antenna 200 of the reception antenna 20 (the above described constant number M in the example embodiment) and the number of the antenna element 201 of the array antenna 200 (the above described constant number N in the example embodiment). The system information may include distance information relating to transmission distance between the transmission antenna 10 and the reception antenna 20 (namely, a distance of the transmission path 3). The distance information may include information relating to distances of MN×MN transmission paths that are secured between the M×N antenna elements 101 of the transmission antenna 10 and the M×N antenna elements 201 of the reception antenna 20, respectively. Incidentally, when the transmission distance between the transmission antenna 10 and the reception antenna 20 is determined uniquely, a relative positional relationship between (namely, the arrangement aspect of) the transmission antenna 10 and the reception antenna 20 is determined uniquely. Thus, the distance information may be regarded to be information relating to the relative positional relationship between (namely, the arrangement aspect of) the transmission antenna 10 and the reception antenna 20. The system information may include carrier wave information relating to carrier wave used by the communication system SYS. The carrier wave information may include information relating to at least one of a frequency and a wavelength of the carrier wave. The system information may include processing information relating to a signal processing performed by the transmission apparatus 1 and a reception processing performed by the reception apparatus 2. As described above, the transmission apparatus 1 performs the inverse discrete Fourier transform processing. Thus, the processing information may include information relating to the inverse discrete Fourier transform processing. The information relating to the inverse discrete Fourier transform processing may include information relating to the Fourier transform matrix $F_N$ having the size of N rows×N columns. As described above, the reception apparatus 2 performs the discrete Fourier transform processing. Thus, processing information may include information relating to the inverse discrete Fourier transform processing. The information relating to the discrete Fourier transform processing may include information relating to the Fourier transform matrix $F_N$ having the size of N rows×N columns.

Then, the transmission path model generation unit 2131 generates the transmission path matrix H on the basis of the system information obtained at the step S10 (a step S11). The transmission path model generation unit 2131 generates the transmission path matrix H that indicates a theoretical state of the transmission path 3 that is calculated from the system information, instead of the transmission path matrix H that indicates an actual state of the transmission path 3 (typically, the transmission path matrix H that is generated on the basis of an actual measured value of the state of the transmission path 3). Thus, the transmission path generation unit 2131 may be regarded to calculate a theoretical value, an estimated value or an approximate value of the transmission path matrix H.

The transmission path matrix H includes, as a [ij] matrix component, a submatrix H[i,j] that indicates a state of the transmission path 3 between the array antenna 100#j of the transmission antenna 10 and the array antenna 200#i of the reception antenna 20, as illustrated in FIG. 4 described above. The submatrix H[i,j] is a matrix that is obtained by multiplying the Fourier transform matrix $F_N$, the inverse matrix of the Fourier transform matrix $F_N$ and a matrix that has a size of N rows×N columns and that includes a matrix component $h[i,j]_{s,t}$ as a matrix component at a "s"-th row and a "t"-th column. The matrix component $h[i,j]_{s,t}$ is a radio propagation gain between the array antenna 100#j and the array antenna 200#i (more specifically, a radio propagation gain between the antenna element 101#t(#j) and the antenna element 201#s(#j)). Thus, the matrix component at the "s"-th row and the "t"-th column of the submatrix H[i,j] is a matrix component that depends on the matrix component $h[i,j]_{s,t}$ and typically indicates a state of the transmission path 3 between the antenna element 101#t(#j) of the array antenna 100#j and the antenna element 201#s(#i) of the array antenna 200#i. The matrix component $h[i,j]_{s,t}$ is calculatable by using an equation 2. Note that "G" in the equation denotes a constant number that is determined on the basis of a factor other than a radio propagation in advance. "d(ij;s,t)" in the equation 2 denotes a transmission distance between the antenna element 101#t(#j) of the array antenna 100#j and the antenna element 201#s(#i) of the array antenna 200#i. "λ" in the equation 2 denotes the wavelength of the carrier wave that is used by the communication system SYS. "exp" in the equation 2 denotes an exponential function a base of which is a Napier's constant.

$$h[i,j]_{s,t} = \frac{G\lambda}{4\pi d(i,j;s,t)} \exp\left(-\frac{2\pi d(i,j;s,t)}{\lambda}\sqrt{-1}\right) \qquad \text{[Equation 2]}$$

Thus, in order to generate the transmission path matrix H, the transmission path model generation unit 2131 calculates the N×N matrix components $h[i,j]_{s,t}$ by using the distance information (namely, the transmission distance d(ij;s,t)) of the system information, the carrier wave information (namely, the wavelength λ) of the system information and the equation 2. Then, the transmission path model generation unit 2131 generates the submatrix H[i,j] by using the processing information (especially, the Fourier transform matrix $F_N$) of the system information and the calculated N×N matrix components $h[i,j]_{s,t}$. Then, the transmission path model generation unit 2131 generates the submatrices H[1,1] to H[M,M] by repeating same operation while changing the variable number i between 1 and M and changing the variable number j between 1 and M. As a result, the transmission path matrix H is generated. In this case, the transmission path model generation unit 2131 may determine the number of row and the number of column of each of the submatrix H[i,j] and the transmission path matrix H on the basis of the antenna information (namely, the number of each of the array antennas 100 and 200 and the antenna elements 101 and 201) of the system information.

Again in FIG. 6, then, the signal classification unit 2132 classifies the M×N transmission signals x[1,1] to x[M,N] included in the transmission signal x into a plurality of signal groups X (namely, a plurality of groups each of which is regarded to be constituted by at least two of the transmission signals x[1,1] to x[M,N]) on the basis of the transmission path matrix H generated at the step S11 (a step S12). In the example embodiment, the signal classification unit 2132 classifies the M×N transmission signals x[1,1] to x[M,N] into N signal groups $X^{(1)}$ to $X^{(N)}$. Moreover, the signal classification unit 2132 classifies the M×N reception signals y[1,1] to y[M,N] included in the reception signal y into a plurality of signal groups Y (namely, a plurality of groups each of which is regarded to be constituted by at least two of the reception signals y[1,1] to y[M,N]) on the basis of the transmission path matrix H generated at the step S11 (the step S12). In the example embodiment, the signal classification unit 2132 classifies the M×N reception signals y[1,1] to y[M,N] into N signal groups $Y^{(1)}$ to $y^{(N)}$.

The signal classification unit 2132 classifies the transmission signal x and the reception signal y to satisfy such a classification condition that a correlation between the reception signal component and the transmission signal component that are respectively classified into the signal group $Y^{(k)}$ and the signal group $X^{(k)}$ having same index is stronger than a correlation between the reception signal component that is classified into the signal group $Y^{(k)}$ and the transmission signal component that is classified into each of the signal group $X^{(k)}$ to $X^{(k-1)}$ and $X^{(k+1)}$ to $X^{(N)}$. Namely, the signal classification unit 2132 classifies the transmission signal x and the reception signal y into the plurality of signal groups in accordance with the correlation between the reception signal y and the transmission signal x (namely, the correlation between the M×N reception signals y[1,1] to y[M,N]

included in the reception signal y and the M×N transmission signals x[1,1] to x[M,N] included in the transmission signal x.

In the example embodiment, a state where "a correlation between the reception signal component and a first transmission signal component is stronger than a correlation between the reception signal component and a second transmission signal component" may include a state where an influence of the first transmission signal component on the reception signal component is larger than an influence of the second transmission signal component on the reception signal component. The state where "a correlation between the reception signal component and a first transmission signal component is stronger than a correlation between the reception signal component and a second transmission signal component" may include a state where an amount of a variation of the reception signal component when the first transmission signal component varies by a predetermined amount is larger than an amount of a variation of the reception signal component when the second transmission signal component varies by the same predetermined amount.

In the example embodiment, the signal classification unit 2132 uses a magnitude of an absolute value of each matrix component of the transmission path matrix H as the degree of the correlation between one reception signal component and one transmission signal component each of which corresponds to each matrix component. Specifically, the matrix component at the "s"-th row and the "t"-th column of the submatrix H[i,j] that constitutes the transmission path matrix H indicates the state of the transmission path 3 between the "t"-th antenna element 101#t(#j) of the array antenna 100#j of the transmission antenna 10 and the "s"-th antenna element 201#s(#i) of the array antenna 200#i of the reception antenna 20. Thus, the magnitude of the absolute value of the matrix component at the "s"-th row and the "t"-th column of the submatrix H[i,j] indicates a degree of a correlation between the transmission signal x[j,t] transmitted by the "t"-th antenna element 101#t(#j) of the array antenna 100#j and the reception signal y[i,s] received by the "s"-th antenna element 201#s(#i) of the array antenna 200#i. therefore, the signal classification unit 2132 classifies the transmission signal x and the reception signal y so that the transmission signal component and the reception signal component that correspond to the matrix component of the transmission path matrix H the absolute value of which is relatively large are classified into the signal group having the same index (namely, the signal group $Y^{(k)}$ and the signal group $X^{(k)}$, respectively).

In order to classify the transmission signal x and the reception signal y, the signal classification unit 2132 permutates the MN×MN matrix components included in the transmission path matrix H that is generated at the step S11. Specifically, as illustrated in FIG. 8, the signal classification unit 2132 permutates the MN×MN matrix components included in the transmission path matrix H so that the transmission path matrix H is a block diagonal matrix. The block diagonal matrix may be a matrix in which the absolute value of the matrix component that is different from a diagonal block component (a diagonal block matrix component) is smaller than the absolute value of the diagonal block component. Typically, the block diagonal matrix may be a matrix in which the matrix component that is different from the diagonal block component is zero. Specifically, as illustrated in a lower part of FIG. 8, when it is assumed that the transmission path matrix H in which the MN×MN matrix components are permutated is a block matrix that has a size of MN rows×MN columns and that contains a submatrix $H^{(k,m)}$ having a size of M rows×M columns as an (k, m) matrix component (wherein, m is a variable number representing an integer that is equal to or larger than 1 and that is equal to or smaller than N), the transmission path matrix H is a block diagonal matrix that satisfies such a condition that the submatrix $H^{(k,m)}$ is not a zero matrix when k is equal to m and the submatrix $H^{(k,m)}$ is the zero matrix when k is not equal to m. Alternatively, the transmission path matrix H may be a block diagonal matrix that satisfies such a condition that a norm (namely, a sum of the absolute values of the matrix components) of the submatrix $H^{(k,m)}$ when k is equal to m is larger than a norm of the submatrix $H^{(k,m)}$ when k is not equal to m. The lowest part of FIG. 8 illustrates an example in which the submatrix $H^{(k,m)}$ is the zero matrix when k is not equal to m, however, the submatrix $H^{(k,m)}$ may not be the zero matrix even when k is not equal to m. Note that the transmission path matrix H means a matrix in which the matrix components are permutated to be the block diagonal matrix unless there is a specific notation.

The signal classification unit 2132 further permutates the M×N transmission signals x[1,1] to x[M,N] and the M×N reception signals y[1,1] to y[M,N] in the arithmetic equation (see an upper part of FIG. 8) that indicates the relationship between the transmission signal x and the reception signal y along with the permutation of the matrix components of the transmission path matrix H. Specifically, the signal classification unit 2132 permutates the M×N transmission signals x[1,1] to x[M,N] and the M×N reception signals y[1,1] to y[M,N] so that a relationship between the M×N transmission signals x[1,1] to x[M,N] and the M×N reception signals y[1,1] to y[M,N] does not change even when the matrix components of the transmission path matrix H are permutated. As a result, the relationship between the transmission signal x and the reception signal y is changed from the relationship illustrated in FIG. 4 (namely, the relationship before the MN×MN signal components are permutated) to the relationship illustrated in the lower part of FIG. 8 (namely, the relationship after the MN'3 MN signal components are permutated).

Then, the signal classification unit 2132 divides the transmission signal x in which the transmission signal components are permutated into N transmission signals x(1) to x(N) each of which includes M consecutive (sequential) transmission signal component(s). In the same manner, the signal classification unit 2132 divides the reception signal y in which the reception signal components are permutated into N reception signals y(1) to y(N) each of which includes M consecutive (sequential) reception signal component(s). Here, since the transmission path matrix H is the block diagonal matrix, the norm of the submatrix $H^{(k,k)}$ is larger than the norm of each of the submatrices $H^{(k,1)}$ to $H^{(k,k-1)}$ and $H^{(k,k+1)}$ to $H^{(k,N)}$. Thus, the transmission path matrix H indicates that the correlation between the reception signal $y^{(k)}$ and the transmission signal $x^{(k)}$ is stronger than the correlation between the reception signal $y^{(k)}$ and each of the transmission signals $x^{(1)}$ to $x^{(k-1)}$ and $x^{(k+1)}$ to $x^{(N)}$. therefore, the signal classification unit 2132 respectively classifies the transmission signal $x^{(k)}$ and the reception signal $y^{(k)}$ into the signal group $X^{(k)}$ and the signal group $Y^{(k)}$ having the same index.

The signal classification unit 2132 outputs, to each of the signal estimation unit 212 and the communication capacity calculation unit 2133, the index that is used to identify the transmission signal component classified into each signal group X (for example, the variable number j that specifies the array antenna 100 and the variable number t that specifies the antenna element 101 described above). The signal classification unit 2132 outputs, to each of the signal estimation unit 212 and the communication capacity calculation unit 2133, the index that is used to identify the reception signal component classified into each signal group Y (for example, the variable number i that specifies the array antenna 200 and the variable number s that specifies the antenna element 201 described above).

Again in FIG. 6, then, the communication capacity calculation unit 2133 calculates a communication capacity C that indicates an amount of information (especially, a maximum value thereof) that is transmittable through the transmission path 3 on the basis of the transmission path matrix H and a classified result of the signal group X and the signal group Y by the signal classification unit 2132 (a step S13). In the example embodiment, the communication capacity calculation unit 2133 calculates three types of communication capacities $C_1$, $C_2$ and $C_3$.

The communication capacity Ci indicates an amount of information that is transmittable when the transmission signal x is transmitted by using all of MN×MN transmission paths that are secured between the M×N antennal elements 101 of the transmission antenna 10 and the M×N antennal elements 201 of the reception antenna 20. In this case, the estimated value of the transmission signal component transmitted by each antenna element 101 is estimated from all of the M×N reception signals y[1,1] to y[M,N] received by M×N antennal elements 201, respectively. Thus, the communication capacity $C_1$ may be regarded to indicate an amount of information that is transmittable when the estimated value of the transmission signal component transmitted by each antenna element 101 is estimated from all of the M×N reception signals y[1,1] to y[M,N]. Namely, the communication capacity $C_1$ may be regarded to indicate an amount of information that is transmittable when the estimation signal xe[j,t], which is the estimated value of the transmission signal x[j,t] transmitted by the "t"-th antenna element 101#t(#j) of the array antenna 100#j, is estimated from all of the M×N reception signals y[1,1] to y[M,N].

The communication capacity calculation unit 2133 may calculate the communication capacity $C_1$ by using an equation 3. "A(1) to A(MN)" in the equation 3 denote MN×MN eigen values of a matrix that is obtained by multiplying the transmission matrix H with the conjugate transpose matrix H†, respectively. "SNR" in the equation 3 denotes the Signal to Noise Ratio.

$$C_1 = \sum_{p=1}^{M \times N} \log_2(1 + \Lambda(p) \times SNR) \qquad \text{[Equation 3]}$$

The communication capacity $C_2$ indicates an amount of information that is transmittable when the transmission signal x is transmitted by using a set of the antenna element 101 and the antenna element 201 that corresponds to a set of the transmission signal component and the reception signal component that are respectively classified into the signal groups X and Y having the same index (namely, the correlation between which is relatively strong). Especially, the communication capacity $C_2$ indicates a theoretical value (for example, a theoretical limit value) of the amount of information that is transmittable when the transmission signal x is transmitted by using a set of the antenna element 101 and the antenna element 201 that corresponds to a set of the transmission signal component and the reception signal component the correlation between which is relatively strong. Namely, communication capacity $C_2$ indicates the theoretical value of the amount of information that is transmittable when the transmission signal x is transmitted without using a set of the antenna element 101 and the antenna element 201 that corresponds to a set of the transmission signal component and the reception signal component that are respectively classified into the signal groups X and Y having the different indexes (namely, the correlation between which is relatively weak). In this case, the estimated value of the transmission signal component transmitted by each antenna element 101 is estimated from the reception signal component classified into the signal group Y that has the same index as the signal group X into which the transmission signal component is classified. Namely, the estimated value of the transmission signal component transmitted by each antenna element 101 is estimated from the reception signal that has a relatively strong correlation with the transmission signal component. On the other hand, the estimated value of the transmission signal component transmitted by each antenna element 101 is estimated without using the reception signal that has a relatively weak correlation with the transmission signal component. Thus, the communication capacity $C_2$ may be regarded to indicate amount of information that is transmittable when the estimated value of the transmission signal component transmitted by each antenna element 101 is estimated by using the reception signal that has the relatively strong correlation with the transmission signal component and without using the reception signal that has the relatively weak correlation with the transmission signal component.

The communication capacity calculation unit 213 may calculate the communication capacity $C_2$ by using an equation 4. "λ(k,1) to k(k,M)" in the equation 4 denote M eigen values of a matrix that is obtained by multiplying the submatrix $H^{(k,k)}$ with a matrix $H\dagger^{(k,k)}$ that is a conjugate transpose matrix of the submatrix $H^{(k,k)}$, respectively. "SNR" in the equation 4 denotes the Signal to Noise Ratio.

$$C_2 = \sum_{k=1}^{N} \sum_{p=1}^{M} \log_2(1 + \lambda(k, p) \times SNR) \qquad \text{[Equation 4]}$$

The communication capacity $C_3$ indicates an amount of information that is transmittable when the transmission signal x is transmitted by using a set of the antenna element 101 and the antenna element 201 that corresponds to a set of the transmission signal component and the reception signal component the correlation between which is relatively strong, as with the communication capacity $C_2$. The communication capacity $C_3$ is different from the communication capacity $C_2$ in that the communication capacity $C_3$ indicates an amount of information that is transmittable when the transmission signal x is estimated by using the signal estimation method based on the Minimum Mean Square Error (alternatively, another signal estimation method that is different from the signal estimation method used by the signal estimation unit 212, the same is applied to the below described description). Namely, the communication capacity $C_3$ may be regarded to indicate an amount of information that is transmittable when the estimated value of the transmission signal component transmitted by each antenna element 101 is estimated from the reception signal that has the relatively strong correlation with the transmission signal component by using the signal estimation method based on the Minimum Mean Square Error.

The communication capacity calculation unit 213 may calculate the communication capacity $C_3$ by using an equation 5. "w(k,1) to w(k,M)" in the equation 5 denote M diagonal matrix components of a matrix B that has a size of M rows×M columns and that is calculated by an equation 6, respectively. "I" in the equation 6 denotes an identity matrix (a unit matrix) having a size of M rows×M columns.

$$C_2 = \sum_{k=1}^{N}\sum_{p=1}^{M} \log_2\left(\frac{w(k,p)}{1-w(k,p)}\right)$$ [Equation 5]

$$B = H^{(k,k)\dagger}\left(H^{(k,k)}H^{(k,k)\dagger} + SNR^{-1}I\right)^{-1}H^{(k,k)}$$

Then, the parameter set unit 2134 set the parameters $\beta$, $\rho$, $\tau$ and $\eta$ on the basis of the communication capacities $C_1$, $C_2$ and $C_3$ calculated at the step S13 (a step S14 to a step S19).

In order to set the parameters $\beta$, $\rho$, $\tau$ and $\eta$, the parameter set unit 2134 determines whether or not the communication capacity $C_1$ is equal to the communication capacify $C_2$ (a step S14). As a result of the determination at the step S14, when it is determined that the communication capacity $C_1$ is equal to the communication capacify $C_2$ (the step S14: Yes), the parameter set unit 2134 sets the parameter $\beta$ to be a fixed value that is set independent from a learning operation described later (a step S15). Specifically, the parameter set unit 2134 sets the parameter $\beta_r^{(k)}$ (namely, each of the N×R parameters $\beta_1^{(1)}$ to $\beta_R^{(N)}$ to be a zero vector. Namely, the parameter set unit 2134 sets a vector component of the parameter $\beta_r^{(k)}$ to be zero that is the fixed value. On the other hand, as a result of the determination at the step S14, when it is determined that the communication capacity $C_1$ is not equal to the communication capacify $C_2$ (the step S14: No), the parameter set unit 2134 sets the parameter $\beta$ to be a learned value that is learnable by the learning operation described later (a step S16). Specifically, the parameter set unit 2134 sets the parameter $\beta_r^{(k)}$ to be a M-dimensional vector including M vector component that is the learnable learned value. When a value that is set to the parameter r $\beta_r^{(k)}$ as the learned value is already learned, the parameter set unit 2134 may set the parameter $\beta_r^{(k)}$ to be the value that is already learned as the learned value. When a value that is set to the parameter r $\beta_r^{(k)}$ as the learned value is not learned yet, the parameter set unit 2134 may set the parameter $\beta_r^{(k)}$ to be an initial value of the learned value. The initial value may be any value. A M-dimensional vector including M values an average of which is 1 and a distribution of which is a normal distribution is one example of the initial value.

In parallel with, after or before the operation from the step S14 to the step S16, the parameter set unit 2134 determines whether or not the communication capacity $C_2$ is equal to the communication capacify $C_3$ (a step S17). As a result of the determination at the step S17, when it is determined that the communication capacity $C_2$ is equal to the communication capacify $C_3$ (the step S17: Yes), the parameter set unit 2134 sets the parameter $\rho$ to be a fixed value (a step S18). Specifically, the parameter set unit 2134 sets the parameter $\rho_r^{(k)}$ (namely, each of the N×R parameters $\rho_1^{(1)}$ to $\rho_R^{(N)}$) to be a vector including M vector component that is set as a fixed value, which does not change depending on the variable number k and the variable number r, in advance. Namely, the parameter set unit 2134 sets a vector component of the parameter $\rho_r^{(k)}$ to be the fixed value. Moreover, the parameter set unit 2134 sets the parameter $\tau$ to be a fixed value (the step S18). Specifically, the parameter set unit 2134 sets the parameter $\tau_{r(k)}$ (namely, each of the N×R parameters $\tau_1^{(1)}$ to $\tau_R^{(N)}$ to be a vector including M vector component that is an upper limit value that is allowed to be used by the communication system SYS (for example, a value that is an infinite number). Namely, the parameter set unit 2134 sets a vector component of the parameter $\tau_r^{(k)}$ to be the upper limit value that is allowed to be used by the communication system SYS Moreover, the parameter set unit 2134 sets the parameter $\eta$ to be a fixed value (the step S18). Specifically, the parameter set unit 2134 sets the parameter $\eta_r^{(k)}$ (namely, each of the N×R parameters $\eta_1^{(1)}$ to $\eta_R^{(N)}$) to be a zero vector. Namely, the parameter set unit 2134 sets a vector component of the parameter $\eta_r^{(k)}$ to be zero that is the fixed value. On the other hand, as a result of the determination at the step S17, when it is determined that the communication capacity $C_2$ is not equal to the communication capacify $C_3$ (the step S17: No), the parameter set unit 2134 sets each of the parameter $\rho$, $\tau$ and $\eta$ to be a learned value that is learnable by the learning operation (a step S19). Note that the operation for setting each of the parameter $\rho$, $\tau$ and $\eta$ to be the learned value may be same as the operation for setting the parameter $\beta$ to be the learned value.

As a result of the above described operation, the parameters $\beta$, $\rho$, and $\eta$ are set. Namely, the detail of the signal estimation method that is used to estimate the estimation signal xe by the signal estimation unit 212 is set.

The learned value that is set to each of the parameters $\beta$, $\rho$, $\tau$ and $\eta$ is learned by the learning operation. The learning operation may be performed by the reception apparatus 2 or may be performed by an apparatus that is different from the reception apparatus 2. The reception apparatus 2 (alternatively, the apparatus different from the reception apparatus 2, the same is applied to the description relating to the learning operation) may perform the learning operation before the signal estimation unit 212 starts performing the signal estimation operation. The reception apparatus 2 may perform the learning operation in an online manner after the signal estimation unit 212 starts performing the signal estimation operation.

The reception apparatus 2 may learn the parameters $\beta$, $\rho$, $\tau$ and $\eta$ by using a loss function Loss based on an error (for example, a square error) between the estimation signal xe that is finally outputted from the signal estimation unit 212 (namely, a definite estimation signal xef described later) and the transmission signal x that is actually transmitted by the transmission apparatus 1. Specifically, the reception apparatus 2 obtains a learning data that includes a sample value of the transmission signal x (what we call an answer label) and a sample value of the reception signal y that is received by the reception apparatus 2 when the sample value of the transmission signal x is transmitted from the transmission apparatus 1 to the reception apparatus 2. Then, the reception apparatus 2 may learn the parameters $\beta$, $\rho$, $\tau$ and $\eta$ by using the loss function Loss based on the error between the sample value of the transmission signal x and the definite estimation signal xef that is outputted from the signal estimation unit 212 into which the sample value of the reception signal y is inputted..

The reception apparatus 2 may learn the parameters $\beta$, $\rho$, $\tau$ and $\theta$ by using a backpropagation method that is used to learn a parameter of a neural network. An equation 7 indicates one example of the loss function Loss that is used to learn the parameters $\beta$, $\rho$, $\tau$ and $\eta$ by using the backpropagation method and that is based on the square error between the definite estimation signal xef and the transmission signal x. Note that "D" in the equation 7 denote a set of the transmission signal x used to learn the parameters $\beta$, $\rho$, $\tau$ and $\eta$ (namely, a set of a training data).

$$\mathrm{Loss} = \sum_{x \in D} \sum_{k=1}^{N} \| x^{(k)} - xef^{(k)} \|^2 \qquad \text{[Equation 7]}$$

An influence of a learning target (for example, at least one of the parameters β, ρ, τ and η on the loss function loss calculated by the equation 7 can be expressed by a partial differentiation that is calculatable by using an equation 8. Thus, the reception apparatus 2 may lean the learning target by using the equation 8. Note that the equation 8 illustrates an example in which the learning target is the parameter $\rho_r^{(k)}$. "ε" in the equation 8 is a hyper parameter that is allowed to be any value.

$$\rho_r^{(k)} = \rho_r^{(k)} - \varepsilon \frac{\partial \mathrm{Loss}}{\partial \rho_r^{(k)}} \qquad \text{[Equation 8]}$$

<2-2> Signal Estimation Operation performed by Signal Estimation Unit 212

Figure 9:
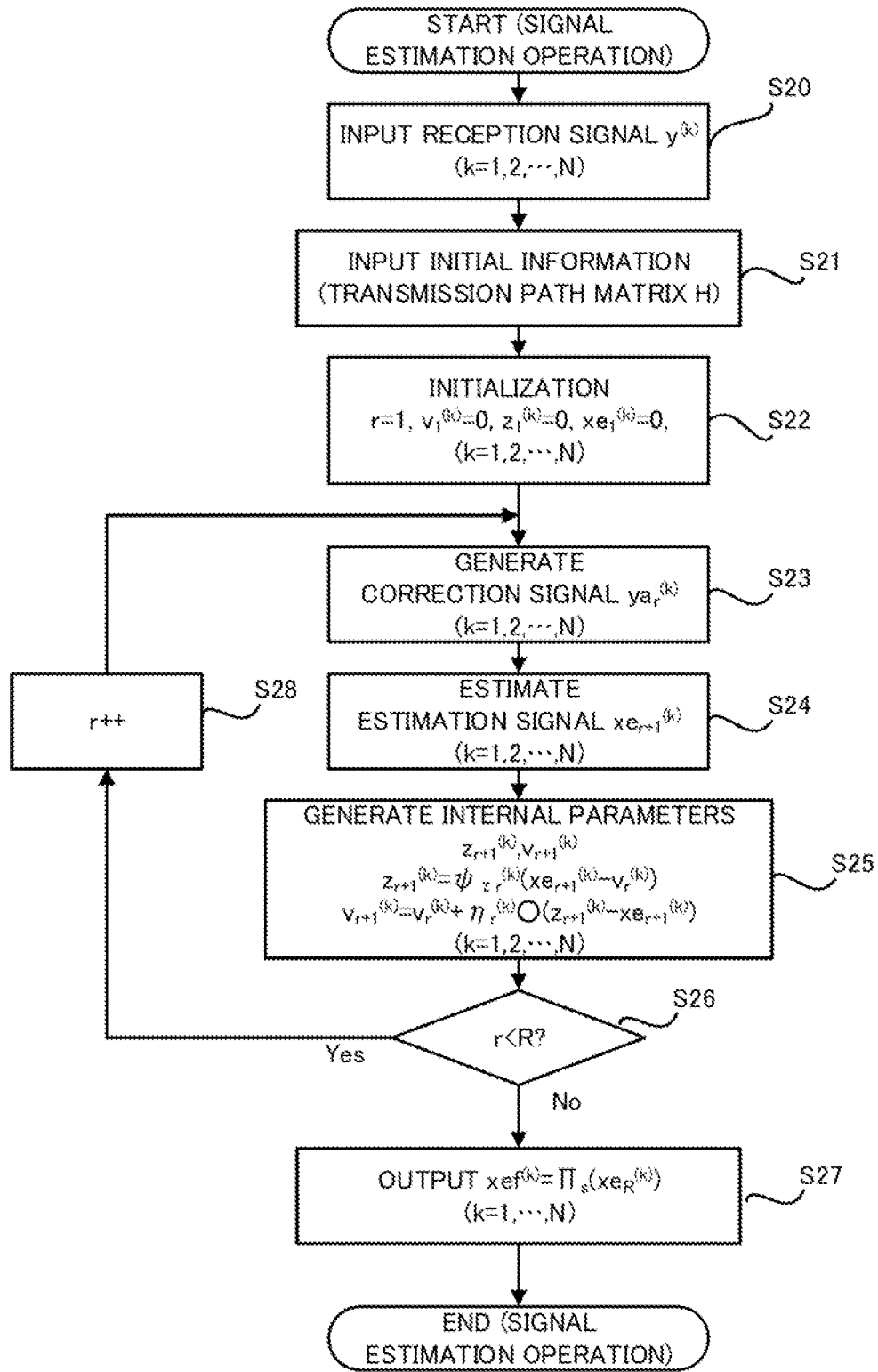
FIG. 9 is a flowchart that illustrates a flow of a signal estimation operations performed by a signal estimation unit.

Next, with reference to FIG. 9, the signal estimation operation performed by the signal estimation unit 212 will be described. FIG. 9 is a flowchart that illustrates a flow of the signal estimation operation performed by the signal estimation unit 212.

As illustrated in FIG. 9, firstly, the reception signal y is inputted into the signal estimation unit 212 (a step S20). In the example embodiment, the reception signal y is inputted into the signal estimation unit 212 in a state where the M×N reception signals y[1,1] to y[M,N] included in the reception signal y are classified into the signal groups $Y^{(1)}$ to $Y^{(N)}$. Namely, the reception signal y is inputted into the signal estimation unit 212 as the reception signal $y^{(1)}$ that is classified into the signal group $Y^{(k)}$ to the reception signal $y^{(N)}$ that is classified into the signal group $Y^{(N)}$. Specifically, the reception signal $y^{(k)}$ expressed by an equation 9 is inputted into the signal estimation unit 212. Note that "[i,s] ∈ $Y^{(k)}$" in the equation 9 denotes the index assigned to the reception signal component that is classified into the signal group $Y^{(k)}$ (for example, the variable number i that specifies the array antenna 200 and the variable number s that specifies the antenna element 201 described above).

$$y^{(k)} = (y[i, s]); \qquad \text{[Equation 9]}$$
$$[i, s] \in Y^{(k)}$$

However, the reception signal y is inputted into the signal estimation unit 212 in a state where the M×N reception signals y[1,1] to y[M,N] included in the reception signal y are not classified into the signal groups $Y^{(1)}$ to $Y^{(N)}$. In this case, the signal estimation unit 212 may classifies the reception signal y into the reception signal $y^{(1)}$ to $y^{(N)}$ on the basis of the signal groups $Y^{(1)}$ to $Y^{(N)}$.

In parallel with, after or before the operation at the step S20, the transmission path matrix H is inputted into the signal estimation unit 212 as initial information (a step S21). Note that the transmission path matrix H inputted into the signal estimation unit 212 to perform the signal estimation operation is a transmission path matrix that is generated on the basis of an actual measured result of the state of the transmission path 3. Namely, the transmission path matrix H inputted into the signal estimation unit 212 is different from the transmission path matrix H generated by the parameter set unit 213 in the parameter set operation (namely, the theoretical value, the estimated value or the approximate value of the transmission path matrix H).

In the example embodiment, the transmission path matrix H is inputted into the signal estimation unit 212 in a state where the matrix components thereof are permutated on the basis of the signal groups $X^{(1)}$ to $X^{(N)}$ and the signal groups $Y^{(1)}$ to $Y^{(N)}$ to be the block diagonal matrix. Namely, the transmission path matrix H that is the block diagonal matrix illustrated in the lower part of FIG. 8 (namely, the block matrix that has the size of MN rows×MN columns and that contains the submatrix $H^{(k,m)}$ having as the (k, m) matrix component) is inputted into the signal estimation unit 212. The submatrix $H^{(k,m)}$ indicates the state of the transmission path 3 between M antennal element 201 that receives the reception signal $y^{(k)}$ classified into the signal group $Y^{(k)}$ and M antennal element 101 that transmits the transmission signal $x^{(m)}$ classified into the signal group $X^{(m)}$. Specifically, the transmission path matrix H that contains the submatrix $H^{(k,m)}$ illustrated in an equation 10 as the (k, m) matrix component may be inputted into the signal estimation unit 212. Note that "[j,t] ∈ $X^{(k)}$" in the equation 10 denotes the index assigned to the transmission signal component that is classified into the signal group $X^{(k)}$ (for example, the variable number j that specifies the array antenna 100 and the variable number t that specifies the antenna element 101 described above).

$$H^{(k,m)} = (h[i, j]_{s,t}); \qquad \text{[Equation 10]}$$
$$[j, t] \in X^{(k)} [i, s] \in Y^{(k)}$$

However, the transmission path matrix H may be inputted into the signal estimation unit 212 in a state where the matrix components thereof are not permutated to be the block diagonal matrix. In this case, the signal estimation unit 212 may permutate the matrix components of the transmission path matrix H on the basis of the signal groups $X^{(1)}$ to $X^{(N)}$ and the signal groups $Y^{(1)}$ to $Y^{(N)}$ to be the block diagonal matrix.

In parallel with, after or before the operation from the step S20 to the step S21, the signal estimation unit 212 performs an initializing operation (a step S22). Specifically, the signal estimation unit 212 set the variable number r to be 1. The variable number r is a variable number that is used to count the number of times of the operation for estimating the estimation signal $xe^{(k)}$ that is the estimated value (an estimated vector) of the transmission signal $x^{(k)}$. This is because the signal estimation unit 212 repeats the operation for estimating the estimation signal $xe^{(k)}$, if needed, as described later. Thus, the estimation signal $xe^{(k)}$ that is estimated by the signal estimation unit 212 "r"-th time is referred to as an "estimation signal $xe_{r+1}^{(k)}$" in the below described description. Moreover, the signal estimation unit 212 set an initial value of each of an internal data $v^{(k)}$ and an internal data $z^{(k)}$, which are used to estimate the estimation signal $xe^{(k)}$ by the signal estimation unit 212, to be zero. Note that the internal data $v^{(k)}$ and the internal data $z^{(k)}$ that are used to estimate the estimation signal $xe_{r+1}^{(k)}$ by the signal estimation unit 212 are referred to as "an internal data $v_r^{(k)}$ and an internal data $z_r^{(k)}$" in the below described description, for the purpose of clear illustration. In this case, the initial values of the internal data $v^{(k)}$ and the internal data $z^{(k)}$ are referred to as "the internal data $v_1^{(k)}$ and the internal data $z_1^{(k)}$". Moreover, for example, the signal estimation unit 212 sets an initial value $xe_1^{(k)}$ of the estimation signal $xe^{(k)}$ to be zero (specifically, a zero vector). The signal estimation unit 212 performs the above described initializing operation N times while updating the variable k from 1 to N. In this case, the signal estimation unit 212 may perform N initializing operations in sequence or may perform the N initializing operations in parallel.

Then, the signal estimation unit 212 generates a correction signal $ya^{(k)}$ that is a corrected value of the reception signal $y^{(k)}$ on the basis of the reception signal $y^{(k)}$, the transmission path matrix H, the parameter $\beta_r^{(k)}$ set by the parameter set unit 213 and the estimation signal $xe_r^{(k)}$ (a step S23). In the below described description, the correction signal $ya^{(k)}$ that is generated by the signal estimation unit 212 "r"-th time is referred to as a "correction signal $ya_r^{(k)}$". Specifically, the signal estimation unit 212 generates the correction signal $ya_r^{(k)}$ by using an equation 11. Note that an operator "∘" in the equation 11 means a Hadamard product (multiplication). The signal estimation unit 212 performs the above described operation at the step S23 N times while updating the variable k from 1 to N. In this case, the signal estimation unit 212 may perform N operations at the step S23 in sequence or may perform the N operations at the step S23 in parallel.

$$ya_r^{(k)} = y^{(k)} - \beta_r^{(k)} \circ \sum_{p=1, p \neq k}^{N} H^{(k,p)} xe_r^{(p)} \qquad \text{[Equation 11]}$$

Here, a second monomial of a right side of the equation 11 corresponds to a signal component caused by the transmission signal component that is included in the reception signal y and that is other than the transmission signal $x^{(k)}$ having the relatively strong correlation with the reception signal $y^{(k)}$ (namely, caused by the transmission signals $x^{(1)}$ to $x^{(k-1)}$ and $x^{(k+1)}$ to $x^{(N)}$. Namely, the second monomial of the right side of the equation 11 corresponds to a signal component that is included in the reception signal $y^{(k)}$, that is caused by an interference such as a fading and that is not included in an ideal reception signal $y^{(k)}$ received by the reception apparatus 2 in an ideal environment in which the interference such as the fading is not generated. Thus, the correction signal $ya^{(k)}$ is substantially a signal obtained by eliminating, from the reception signal y, information relating to the transmission signal component other than the transmission signal $x^{(k)}$ (namely, an interference component).

Then, the signal estimation unit 212 generates the estimation signal $xe_{r+1}^{(k)}$ that is a corrected value of the reception signal $y^{(k)}$ on the basis of the correction signal $ya_r^{(k)}$, the submatrix $H^{(k,k)}$, the parameter $\rho_r^{(k)}$ set by the parameter set unit 213 and the internal data $v_r^{(k)}$ and $z_r^{(k)}$ (a step S24). Specifically, the signal estimation unit 212 generates the estimation signal $xe_{r+1}^{(k)}$ by using an equation 12. Note that "$D(\rho_r^{(k)})$" in the equation 12 is a diagonal matrix that includes, as the diagonal matrix component, the parameter $\rho_r^{(k)}$ that is the vector including the M dimensional vector component. The signal estimation unit 212 performs the above described operation at the step S24 N times while updating the variable k from 1 to N. In this case, the signal estimation unit 212 may perform N operations at the step S24 in sequence or may perform the N operations at the step S24 in parallel.

$$xe_{r+1}^{(k)} = \qquad \text{[Equation 12]}$$

-continued
$$(H^{(k,k)\dagger} H^{(k,k)} + D(\rho_r^{(k)}))^{-1} \times (H^{(k,k)\dagger} ya_r^{(k)} + D(\rho_r^{(k)}))(z_r^{(k)} + v_r^{(k)})$$

Then, the signal estimation unit 212 updates the internal data $v_r^{(k)}$ and $z_r^{(k)}$ on the basis of the latest estimation signal $xe_{r+1}^{(k)}$ estimated at the step S24 (a step S25). Namely, the signal estimation unit 212 generates the internal data $v_{r+1}^{(k)}$ and $z_{r+1}^{(k)}$ (the step S25). Specifically, the signal estimation unit 212 generates the internal data $z_{r+1}^{(k)}$ by using an equation 13. Note that "Ψ(w)" in the equation 13 is a function for performing a non-liner convert processing on a signal (=a vector) w including M signal component ($w_1$, $w_2$, ..., and $w_M$) and is a function that is defined by the parameter $\tau_r^{(k)}$ set by the parameter set unit 213. The function Ψ(w) may be defined in advance on the basis of a modulation method (especially, the number of the signal) used by the communication system SYS. One example of function Ψ(w) is expressed in an equation 14. The equation 14 illustrates an example in which the function Ψ(w) is a function that defines the non-liner convert processing that is performed by using a hyperbolic tangent function tanh that is defined by the parameter $\tau_r^{(k)}$ (=$\tau_r^{(k)}$#1, $\tau^{(k)}$#2, ..., $\tau_r^{(k)}$#M). The function Ψ(w) illustrated in the equation 14 is one example of the function Ψ(w) that is used when the communication system SYS used a Binary Phase Shift Keying (BPSK) modulation method. The signal estimation unit 212 generates the internal data $v_{r+1}^{(k)}$ by using an equation 15 after generating the internal data $z_{r+1}^{(k)}$. Note that an operator "∘" in the equation 15 means a Hadamard product (multiplication). The signal estimation unit 212 performs the above described operation at the step S25 N times while updating the variable k from 1 to N. In this case, the signal estimation unit 212 may perform N operations at the step S25 in sequence or may perform the N operations at the step S25 in parallel.

$$z_{r+1}^{(k)} = \psi_r^{(k)}(xe_{r+1}^{(k)} - v_r^{(k)}) \qquad \text{[Equation 13]}$$

$$\psi_r^{(k)} = \left(\tanh\left(\frac{w_1}{\tau_r^{(k)}\#1}\right), \tanh\left(\frac{w_2}{\tau_r^{(k)}\#2}\right), \ldots, \tanh\left(\frac{w_M}{\tau_r^{(k)}\#M}\right)\right) \qquad \text{[Equation 14]}$$

$$v_{r+1}^{(k)} = v_r^{(k)} + \eta_r^{(k)} \circ (z_{r+1}^{(k)} - xe_{r+1}^{(k)}) \qquad \text{[Equation 15]}$$

Then, the signal estimation unit 212 determines whether or not the variable number r is smaller than the constant number R that is used as a threshold value (a step S26). As described above, the variable number r is the variable number that is used to count the number of times the signal estimation unit 212 performs the operation for estimating the estimation signal $xe_{r+1}^{(k)}$. Specifically, the variable number r indicates the number of times the signal estimation unit 212 performs the operation for estimating the estimation signal $xe_{r+1}^{(k)}$ (namely, the number of times the signal estimation unit 212 performs the operation at the step S24). Moreover, the constant number R is a number that is set in advance as the number of times the signal estimation unit 212 should perform the operation for estimating the estimation signal $xe_{r+1}^{(k)}$.

As a result of the determination at the step S26, when it is determined that the variable number r is smaller than the constant number R (the step S26: Yes), the signal estimation unit 212 estimates the estimation signal $xe_{r+1}^{(k)}$ again. Namely, the signal estimation unit 212 newly estimates the estimation signal $xe_{r+2}^{(k)}$. Specifically, the signal estimation unit 212 estimates the estimation signal $xe_{r+1}^{(k)}$ again by increasing the variable number r by one (a step S28) and then performing the operation from the steps S23 to S25 again. At this time, the signal estimation unit 212 estimates the estimation signal $xe_{r+1}^{(k)}$ again by using the above described equation 3. The operation from the steps S23 to S25 is repeated until it is determined that the variable number r is not smaller than the constant number R. Namely, operation from the steps S23 to S25 is repeated R times.

As a result of the determination at the step S26, when it is determined that the variable number r is not smaller than the constant number R (the step S26: No), the signal estimation unit 212 may not estimate the estimation signal $xe_{r+1}^{(k)}$ again. In this case, the signal estimation unit 212 outputs the definite estimation signal xef on the basis of the estimation signal xe including the estimation signal $xe_{r+1}^{(k)}$ ($=xe_R^{(k)}=xe_R^{(1)}$ to $xe_R^{(N)}$ that is estimated at the last time (a step S27). Specifically, the signal estimation unit 212 outputs the definite estimation signal xef that is the final definite estimated value of the transmission signal $x^{(k)}$ by using an equation 16 (the step S27). A symbol "$\Pi_s(w)$" in the equation 16 is a symbol for indicating the transmission signal x having a signal pattern that has the closest distance (Euclidean distance) to the signal pattern of a signal w of all the signal patterns that can be taken by the transmission signal x. Namely, the signal estimation unit 212 outputs, as the definite estimation signal $xef^{(k)}$, the transmission signal $x^{(k)}$ having one signal pattern that has the closest distance (for example, the Euclidean distance) to the signal pattern of the estimation signal $xe_R^{(k)}$ of all the signal patterns that can be taken by the transmission signal $x^{(k)}$. The signal estimation unit 212 performs the above described operation at the step S27 N times while updating the variable k from 1 to N. In this case, the signal estimation unit 212 may perform N operations at the step S27 in sequence or may perform the N operations at the step S27 in parallel. As a result, the signal estimation unit 212 outputs the definite estimation signal xef (namely, the estimated value of the transmission signal x) in which the definite estimation signals $xef^{(1)}$ to $xef^{(N)}$ are arranged in appropriate order.

$$xef^{(k)} = \Pi_s(xe_R^{(k)}) \qquad \text{[Equation 16]}$$

<3> Technical Effect of Communication System SYS

As described above, the signa estimation unit 212 estimates the transmission signal x from the reception signal y by using the signal estimation method the detail of which is specified by the parameters β, ρ, τ and η that are set by the parameter set unit 213. Here, the parameter set unit 213 sets each of the parameters β, τ, τ and η to be either one of the fixed value that is independent from the learning operation and the learned value that is learnable by the learning operation by using the classified result of the signal groups X and Y. Thus, the signal estimation unit 212 can estimate the transmission signal x on the basis of the reception signal y accurately.

Specifically, as described above, the parameter set unit 213 calculates the communication capacities $C_1$, $C_2$ and $C_3$ on the basis of the classified result of the signal groups X and Y, and sets each of the parameters β, ρ, τ and η to be either one of the fixed value that is independent from the learning operation and the learned value that is learnable by the learning operation on the basis of a magnitude relationship among the communication capacities $C_1$, $C_2$ and $C_3$. Here, the magnitude relationship among the communication capacities $C_1$, $C_2$ and $C_3$ varies depending on whether or not the transmission antenna 10 and the reception antenna 20 are arranged in the ideal arrangement aspect.

Specifically, when the communication capacity $C_1$ is equal to the communication capacity $C_2$, the communication capacity $C_2$ when the transmission signal $x^{(k)}$ is estimated on the basis of the reception signal $y^{(k)}$ that has a strong correlation with the transmission signal $x^{(k)}$ is equal to the communication capacity $C_1$ when the transmission signal $x^{(k)}$ is estimated on the basis of all of the reception signals $y^{(1)}$ to $y^{(N)}$. Thus, in this case, it is considered that the reception signal $y^{(k)}$ hardly includes the signal component caused by the interference such as the fading. Namely, it is considered that there is a relatively high possibility that the transmission antenna 10 and the reception antenna 20 are arranged in the ideal arrangement aspect. In this case, the parameter $\beta_r^{(k)}$ is set to be the zero vector as described above. As a result, the above described equation 11 is expressed by an equation 17.

$$ya_r^{(k)} = y^{(k)} \qquad \text{[Equation 17]}$$

As illustrated in the equation 17, when the communication capacity $C_1$ is equal to the communication capacity $C_2$, the signal estimation unit 212 may use the reception signal $y^{(k)}$ as the correction signal $ya^{(k)}$ as it is. Namely, the signal estimation unit 212 may not perform the operation at the above described step S25 in FIG. 9. This is because there is a relatively high possibility that the reception signal $y^{(k)}$ does not include the signal component caused by the interference such as the fading, when the communication capacity $C_1$ is equal to the communication capacity $C_2$, as described above. Namely, the signal estimation unit 212 has less need to consider the second monomial of the right side of the equation 11 that corresponds to the signal component caused by the interference such as the fading. As a result, the signal estimation unit 212 can estimate the transmission signal x from the reception signal y accurately with a relatively small amount of calculation.

On the other hand, when the communication capacity $C_1$ is not equal to the communication capacity $C_2$, it is considered that there is a relative high possibility that the reception signal $y^{(k)}$ includes the signal component caused by the interference such as the fading. Namely, it is considered that there is a relatively high possibility that the transmission antenna 10 and the reception antenna 20 are not arranged in the ideal arrangement aspect. In this case, the signal estimation unit 212 generates the correction signal $ya^{(k)}$ by performing an arithmetic processing for eliminating the signal component caused by the interference such as the fading from the reception signal $y^{(k)}$ and generates the estimation signal $xe^{(k)}$ (namely, estimates the transmission signal $x^{(k)}$ on the basis of not the reception signal $y^{(k)}$ but the correction signal $ya^{(k)}$, because the parameter $\beta_r^{(k)}$ is not set to be the zero vector as a general rule as described above. Thus, the signal estimation unit 212 can estimate the transmission signal x from the reception signal y by considering the influence of the interference (namely, considering the fact that the transmission antenna 10 and the reception antenna 20 are not arranged in the ideal arrangement aspect). As a result, the signal estimation unit 212 can estimate the transmission signal x from the reception signal y more accurately, compared to the case where the transmission signal $x^{(k)}$ is estimated without using the correction signal $ya^{(k)}$.

Moreover, since the parameter $\beta_r^{(k)}$ is set to be the learned value that is learnable, the signal estimation unit 212 can generate the correction signal $ya_r^{(k)}$ in which the signal component caused by the interference such as the fading is properly eliminated from the reception signal) $y^{(k)}$ by considering an actual communication environment and the like of the communication system SYS, compared to the case where the parameter $\beta_r^{(k)}$ is set to be the fixed value without exception. Thus, the signal estimation unit 212 can estimate the transmission signal x from the reception signal y by considering the influence of the interference more properly (namely, considering the fact that the transmission antenna 10 and the reception antenna 20 are not arranged in the ideal arrangement aspect more properly). As a result, the signal estimation unit 212 can estimate the transmission signal x from the reception signal y more accurately, compared to the case where the parameter $\beta_r^{(k)}$ is set to be the fixed value without exception.

Moreover, when the communication capacity $C_2$ is equal to the communication capacity $C_3$, the theoretical value of the communication capacity (namely, the communication capacity $C_2$) when the transmission signal $x^{(k)}$ is estimated on the basis of the reception signal) $y^{(k)}$ that has the strong correlation with the transmission signal $x^{(k)}$ is equal to the communication capacity $C_3$ when the transmission signal $x^{(k)}$ is estimated on the basis of the reception signal $y^{(k)}$ that has the strong correlation with the transmission signal $x^{(k)}$ by the signal estimation method based on the Minimum Mean Square Error. Namely, the communication capacity $C_3$ when the transmission signal $x^{(k)}$ is estimated by using the signal estimation method based on the Minimum Mean Square Error is equal to a theoretical upper limit value thereof. Here, the signal estimation method based on the Minimum Mean Square Error has such an advantage that the transmission signal x can be estimated with a relatively small amount of calculation, however, also has such a disadvantage that an estimation accuracy of the transmission signal x significantly deteriorates in the situation where the transmission antenna 10 and the reception antenna 20 are not arranged in the ideal arrangement aspect. However, when the communication capacity $C_2$ is equal to the communication capacity $C_3$, it is considered that there is a relatively high possibility that the estimation accuracy of the transmission signal x does not deteriorate, because the communication capacity $C_3$ when the transmission signal $x^{(k)}$ is estimated by using the signal estimation method based on the Minimum Mean Square Error is equal to a theoretical upper limit value thereof. Namely, it is considered that there is a relatively high possibility that the transmission antenna 10 and the reception antenna 20 are not arranged in the ideal arrangement aspect.

Thus, in this case, the parameter set unit 213 sets the parameter $\beta_r^{(k)}$ to be the fixed value, sets the parameter $\tau_r^{(k)}$ to be the upper limit value, and sets the parameter $\eta_r^{(k)}$ to be the zero vector, as described above. As a result, firstly, an output of the function $\Psi(w)$ expressed by the equation 14 is fixed to zero. This is because an argument of the hyperbolic function in the equation 14 is zero because the parameter $\tau_r^{(k)}$ is set to be the upper limit value (for example, the value that is the infinite number), and as a result, an output of the hyperbolic function is zero. When the output of the function $\Psi(w)$ is fixed to zero, the internal data $z_r^{(k)}$ is fixed to the zero vector, as expressed by the equation 13. Furthermore, when the parameter $\eta_r^{(k)}$ is set to be the zero vector, the internal data $v_r^{(k)}$ is also fixed to the zero vector, as expressed by the equation 15. As a result, the above described equation 12 for estimating the estimation signal $xe_{r+1}^{(k)}$ is expressed by an equation 18.

$$xe_{r+1}^{(k)} = \left(H^{(k,k)\dagger}H^{(k,k)} + D(\rho_r^{(k)})\right)^{-1} \times H^{(k,k)\dagger} ya_r^{(k)} \qquad \text{[Equation 18]}$$

The signal estimation method expressed by the equation 18 is equivalent to the signal estimation method based on the ideal Minimum Mean Square Error (note that each of the operation for generating the correction signal $ya_r^{(k)}$ and the operation for estimating the estimation signal $xe_{r+1}^{(k)}$ by using the equation 18 are performed R times). Namely, when the communication capacity $C_2$ is equal to the communication capacity $C_3$, the signal estimation unit 212 estimates the transmission signal x from the reception signal y by using the signal estimation method based on the ideal Minimum Mean Square Error. As a result, the signal estimation unit 212 can estimate the transmission signal x from the reception signal y accurately with a relatively small amount of calculation.

On the other hand, when the communication capacity $C_2$ is not equal to the communication capacity $C_3$, it is considered that there is a relatively high possibility that the transmission antenna 10 and the reception antenna 20 are not arranged in the ideal arrangement aspect. In this case, each of the parameters $\beta_r^{(k)}$, $\rho_r^{(k)}$, $\tau_r^{(k)}$ and $\eta_r^{(k)}$ is not set to be the fixed value as a general rule. Thus, the signal estimation unit 212 estimates the transmission signal x by using the signal estimation method that is proposed in the example embodiment and that can estimate the transmission signal x more accurately than the signal estimation method based on the Minimum Mean Square Error. Thus, the signal estimation unit 212 can estimate the transmission signal x from the reception signal y more accurately, compared to the case where the transmission signal x is always estimated by using the signal estimation method based on the Minimum Mean Square Error.

Moreover, since each of the parameters $\beta_r^{(k)}$, $\rho_r^{(k)}$, $\tau_r^{(k)}$ and $\eta_{r(k)}$ is set to be the learned value that is learnable, the signal estimation unit 212 estimates the transmission signal x by using the signal estimation method that is tuned by considering an actual communication environment and the like of the communication system SYS, compared to the case where each of the parameters $\beta_r^{(k)}$, $\rho_r^{(k)}$, $\tau_r^{(k)}$ and $\eta_r^{(k)}$ is set to be the fixed value without exception. Thus, the signal estimation unit 212 can estimate the transmission signal x from the reception signal y by considering the influence of the interference more properly (namely, considering the fact that the transmission antenna 10 and the reception antenna 20 are not arranged in the ideal arrangement aspect more properly). As a result, the signal estimation unit 212 can estimate the transmission signal x from the reception signal y more accurately, compared to the case where each of the parameters $\beta_r^{(k)}$, $\rho_r^{(k)}$, $\tau_r^{(k)}$ and $\eta_r^{(k)}$ is set to be the fixed value without exception.

As described above, the signal estimation unit 212 can estimate the transmission signal x from the reception signal y accurately in both of the case where there is a relatively high possibility that the transmission antenna 10 and the reception antenna 20 are arranged in the ideal arrangement aspect and the case where there is a relatively high possibility that the transmission antenna 10 and the reception antenna 20 are not arranged in the ideal arrangement aspect.

Moreover, when all of the communication capacities $C_1$, $C_2$ and $C_3$ are equal to one another, the reception signal $y^{(k)}$ is equal to the correction signal $ya^{(k)}$, and thus, the signal estimation method expressed by the equation 18 is same as the signal estimation method based on the ideal Minimum Mean Square Error. Thus, the signal estimation unit 212 may not necessarily repeat each of the operation for generating the correction signal $ya_r^{(k)}$ and the operation for estimating the estimation signal $xe_{r+1}^{(k)}$ by using the equation 18 a plurality of times. Namely, the signal estimation unit 212 can estimate the transmission signal x from the reception signal y accurately with a relatively small amount of calculation. In this case, the constant value R that indicates the number of times of repeating each of the operation for generating the correction signal $ya_r^{(k)}$ and the operation for estimating the estimation signal $xe_{r+1}^{(k)}$ may be set to be 1.

<4> Modified Example

Next, a modified example of the communication system SYS will be described.

<4-1> Modified Example of Signal Estimation Operation

Figure 10:
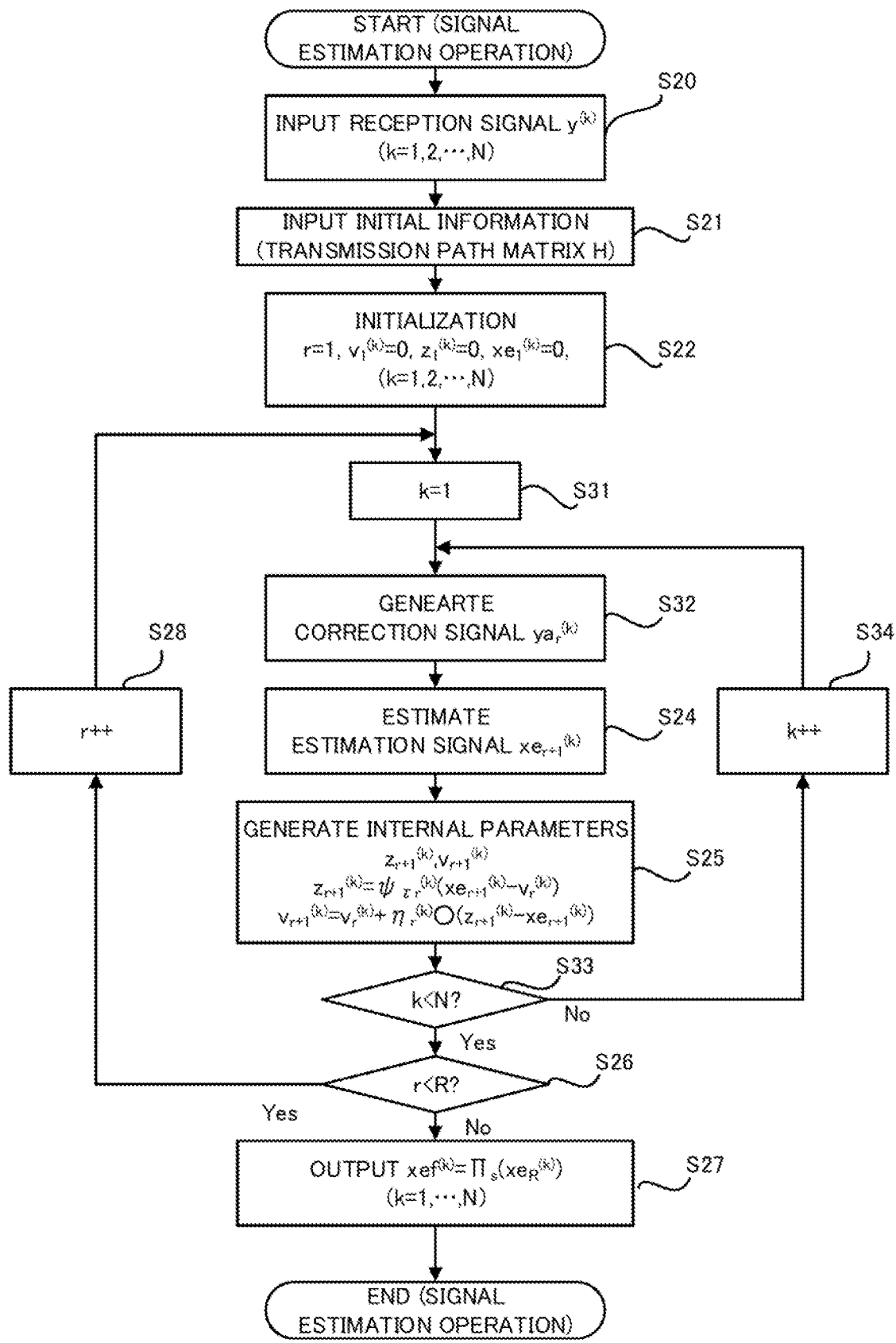
FIG. 10 is a flowchart that illustrates a flow of a modified example of the signal estimation operations performed by the signal estimation unit.

Firstly, with reference to FIG. 10, a modified example of the signal estimation operation performed by the signal estimation unit 212 will be described. FIG. 10 is a flowchart that illustrates a flow of the modified example of the signal estimation operation performed by the signal estimation unit 212.

As illustrated in FIG. 10, even in the modified example, the signal estimation unit 212 performs the operation from the steps S20 to S22. Namely, the reception signals $y^{(1)}$ to $y^{(N)}$ and the transmission path matrix H are inputted into the signal estimation unit 212, and the signal estimation unit 212 performs the initializing operation. Then, the signal estimation unit 212 sets the variable number k to be 1 (a step S31).

Then, the signal estimation unit 212 generates the correction signal $ya_r^{(k)}$ on the basis of the reception signal $y^{(k)}$, the transmission path matrix H, the parameter $\beta_r^{(k)}$ set by the parameter set unit 213 and the estimation signal $xe_r^{(k)}$ (a step S32). Note that the operation at the step S32 is different from the operation for generating the correction signal $ya_r^{(k)}$ at the step S23 of FIG. 9 in that an equation used to generate the correction signal $ya_r^{(k)}$ at the step S32 is different from that at the step S23. Specifically, in the modified example, the signal estimation unit 212 generates the correction signal $ya_r^{(k)}$ by using an equation 19.

$$ya_r^{(k)} = y^{(k)} - \beta_r^{(k)} \circ \left( \sum_{p=1}^{k-1} H^{(k,p)} xe_{r+1}^{(p)} + \sum_{p=k+1}^{N} H^{(k,p)} xe_r^{(p)} \right) \quad \text{[Equation 19]}$$

Then, even in the modified example, the signal estimation unit 212 performs the operation from the steps S24 to S25. Namely, the signal estimation unit 212 generates the estimation signal $xe_{r+1}^{(k)}$ by using the correction signal $ya_r^{(k)}$ generated at the step S32, and updates the internal data $v_r^{(k)}$ and $z_r^{(k)}$. Then, the signal estimation unit 212 determines whether or not the variable number k is smaller than the constant value R (a step S33).

As a result of the determination at the step S33, when it is determined that the variable number k is smaller than the constant number N (the step S33: No), it is considered that the signal estimation unit 212 already generates the estimation signals $xe_{r+1}^{(1)}$ to $xe_{r+1}^{(k)}$, however, does not yet generate the estimation signals $xe_{r+1}^{(k+1)}$ to $xe_{r+1}^{(N)}$. Thus, in this case, the signal estimation unit 212 increases the variable number k by one (a step S34) and repeat the operation from the step S23 to the step S25 in order to generate the estimation signals $xe_{r+1}^{(k+1)}$ to $xe_{r+1}^{(N)}$.

On the other hand, as a result of the determination at the step S33, when it is determined that the variable number k is not smaller than the constant number N (the step S33: Yes), it is considered that the signal estimation unit 212 already generates all of the estimation signals $xe_{r+1}^{(1)}$ to $xe_{r+1}^{(N)}$. In this case, the signal estimation unit 212 repeats a series of operation for generating the estimation signals $xer_{r+1}^{(1)}$ to $xe_{r,1}^{(N)}$ R times (the steps S28, S31 to S32, S24 to S25 and S33) until the estimation signals $xe_R^{(1)}$ to $xe_R^{(N)}$ are generated (the step S26: Yes). Then, the signal estimation unit 212 outputs the definite estimation signa xef (the step S27).

As described above, in the modified example, a series of operation including the operation for generating the correction signal $ya_r^{(k)}$ (the step S32), the operation for generating the estimation signal $xe_{r+1}^{(k)}$ (the step S24) and the operation for updating the internal data $v_r^{(k)}$ and $z_r^{(k)}$ (the step S25) is repeated N times while increasing the variable number k by one. Here, the signal estimation unit 212 generates the correction signal $ya_r^{(k)}$ by using the above described equation 19. Thus, the signal estimation unit 212 generates the estimation signal $xe_{r+1}^{(k)}$ by using the correction signal $ya_{r+1}^{(k)}$ that is generated on the basis of the estimation signals $xe_r^{(k+1)}$ to $xe_r^{(N)}$ and $xe_{r+1}^{(k)}$ to $xe_{r+1}^{(k-1)}$. Namely, the operation at the step S32 in FIG. 10 is different from the operation at the step S23 that generates the correction signal $ya_r^{(k)}$ (as a result, generates the estimation signal $xe_{r+1}^{(k)}$ on the basis of the estimation signals $xe_r^{(1)}$ to $xe_r^{(N)}$ in that the operation at the step S32 in FIG. 10 generates the correction signal $ya_r^{(k)}$ (as a result, generates the estimation signal $xe_{r+1}^{(k)}$) on the basis of not only the estimation signals $xe_r^{(k+1)}$ to $xe_r^{(N)}$ but also the estimation signals $xe_{r+1}^{(1)}$ to $xe_{r+1}^{(k-1)}$. In other words, the operation at the step S32 in FIG. 10 is different from the operation at the step S23 that generates the correction signal $ya_r^{(k)}$ (as a result, generates the estimation signal $xe_{r+1}^{(k)}$ without using the estimation signals $xe_{r+1}^{(1)}$ to $xe_{r+1}^{(k-1)}$ in that the operation at the step S32 in FIG. 10 generates the correction signal $ya_r^{(k)}$ (as a result, generates the estimation signal $xe_{r+1}^{(k)}$) on the basis of the estimation signals $xe_{r+1}^{(1)}$ to $xe_{r+1}^{(k-1)}$. As a result, in the modified example, there is a relatively higher possibility that the estimation signal $xe_{r+1}^{(k)}$ converges to the transmission signal $x^{(k)}$ faster, compared to the above described operation illustrated in FIG. 9. This is because not only at least one of the estimation signals $xe_r^{(1)}$ to $xe_r^{(N)}$ that are generated before the variable number r is increased but also at least one of the estimation signals $xe_{r+1}^{(1)}$ to $xe_{r+1}^{(N)}$ that are generated after the variable number r is increased are used in order to generates the estimation signal $xe_{r+1}^{(k)}$ in the modified example. Namely, in the modified example, the signal estimation unit 212 allows the estimation signal $xe_{r+1}^{(k)}$ to converge to the transmission signal $x^{(k)}$ faster while achieving the above described effect.

<4-2> Modified Example of Transmission Antenna 10 and Reception antenna 20

Figure 11:
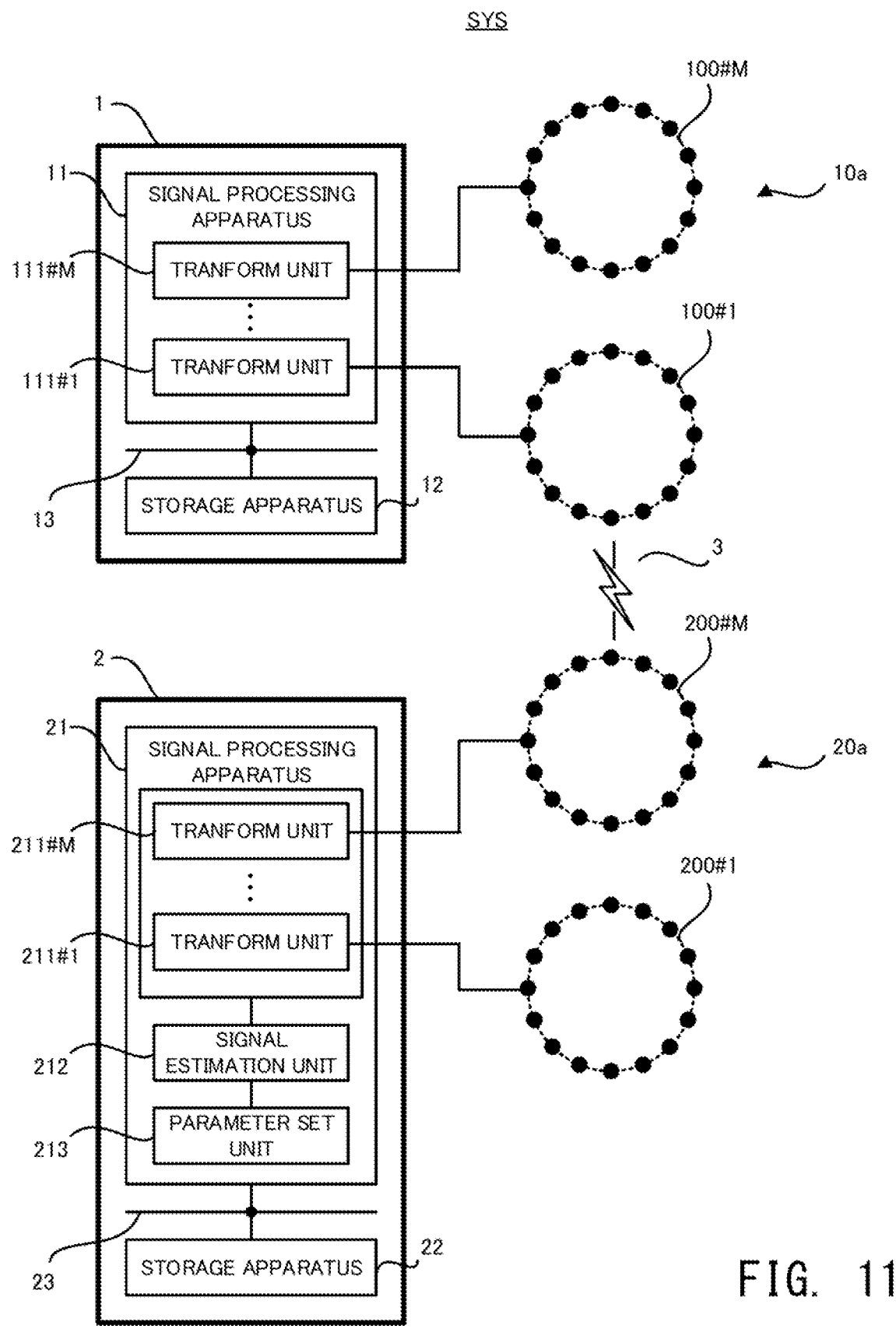
FIG. 11 is a block diagram that illustrates a configuration of a modified example of the communication system.

Then, a modified example of the transmission antenna 10 and the reception antenna 20 will be described. In the above described description, the communication system SYS is provided with the transmission antenna 10 in which the M array antennas 100 are arranged concentrically. On the other hand, in the modified example, as illustrated in FIG. 11, the communication system SYS may be provided with a transmission antenna 10a in which the M array antennas 100 are arranged linearly. Similarly, in the above described description, the communication system SYS is provided with the reception antenna 20 in which the M array antennas 200 are arranged concentrically. On the other hand, in the modified example, as illustrated in FIG. 11, the communication system SYS may be provided with a reception antenna 20a in which the M array antennas 200 are arranged linearly. The transmission antenna 10a and the reception antenna 20a are superior to the transmission antenna 10 and the <5> Supplementary Note With respect to the example embodiments described above, the following Supplementary Notes will be further disclosed.

[Supplementary Note 1]

A signal estimation apparatus that estimates a transmission signal from a reception signal in a communication system, the communication system including:

a transmission apparatus that transmits the transmission signal by using a transmission antenna including a plurality of transmission antenna elements; and a reception apparatus that receives, as the reception signal, the transmission signal transmitted by the transmission apparatus by using a reception antenna including a plurality of reception antenna elements, the signal estimation apparatus comprising a controller, the controller being configured to:

classify a plurality of reception signal components that are included in the reception signal and that are received by the plurality of reception antenna elements, respectively, and a plurality of transmission signal components that are included in the transmission signal and that are transmitted by the plurality of transmission antenna elements, respectively, into a plurality of signal groups in accordance with a degree of a correlation between the reception signal component and the transmission signal component, on the basis of system information that includes antenna information relating to the transmission antenna and the reception antenna, a distance information relating to a transmission distance between the transmission antenna and the reception antenna, a carrier wave information relating to carrier wave used by the communication system and processing information relating to a signal processing performed by the transmission apparatus and a reception processing performed by the reception apparatus;

set, for each signal group, a parameter that specifies a detail of a signal estimation method to be either one of a learned value that is learnable by a learning operation and a fixed value that is independent from the learning operation; and estimate, for each signal group, an estimation signal that is an estimated value of the transmission signal from the reception signal by using the signal estimation method that is specified by the set parameter.

[Supplementary Note 2]

The signal estimation apparatus according to claim 1, wherein the controller is configured to:

estimate a transmission path matrix that indicates a state of a transmission path between the transmission apparatus and the reception apparatus on the basis of the system information;

classify the plurality of reception signal components and the plurality of transmission signal components into the plurality of signal groups by using a magnitude of an absolute value of each matrix component of the transmission path matrix as the degree of the correlation between one reception signal component and one transmission signal component each of which corresponds to each matrix component;

calculate (i) a first communication capacity that indicates an amount of information that is transmittable when each transmission signal component is estimated from the plurality of reception signal components, (ii) a second communication capacity that indicates a theoretical value of an amount of information that is transmittable when each transmission signal component is estimated from at least one reception signal component that has a relatively strong correlation with each transmission signal component and (iii) a third communication capacity that indicates an amount of information that is transmittable when each transmission signal component is estimated from at least one reception signal component that has a relatively strong correlation with each transmission signal component by using another signal estimation method that is different from the signal estimation method used by the controller, on the basis of the transmission path matrix and a classified result of the plurality of signal groups; and set the parameter to be either one of the learned value and the fixed value on the basis of a magnitude relationship among the first to third communication capacities.

[Supplementary Note 3]

The signal estimation apparatus according to claim 2, wherein the controller is configured to set each of a plurality of parameters to be either one of the learned value and the fixed value.

the controller is configured to set a first parameter of the plurality of parameters to be the fixed value when the first communication capacity is equal to the second communication capacity, and set the first parameter to be the learned value when the first communication capacity is not equal to the second communication capacity, the controller is configured to set a second parameter of the plurality of parameters, which is different from the first parameter, to be the fixed value when the second communication capacity is equal to the third communication capacity, and set the second parameter to be the learned value when the second communication capacity is not equal to the third communication capacity.

[Supplementary Note 4]

The signal estimation apparatus according to claim 1, wherein in order to estimate, from the reception signal component $y^{(k)}$ that is classified into a k-th (wherein, k is a variable number representing an integer that is equal to or larger than 1 and that is equal to or smaller than N, and N is a constant number that indicates the number of the signal group and that is equal to or larger than 2) signal group of the plurality of signal groups, the estimation signal $xe^{(k)}$ corresponding to the transmission signal component $x^{(k)}$ that is classified into the k-th signal group, the controller is controlled to:

perform a first operation that initializes internal data $v^{(k)}$ and $z^{(k)}$, which are used to estimate the estimation signal $xe^{(k)}$, and the estimation signal $xe^{(k)}$;

perform a second operation that generates, by using the signal estimation method that is specified by the set parameter, a correction signal $ya^{(k)}$ that is a corrected value of the reception signal component $y^{(k)}$ on the basis of the reception signal component $y^{(k)}$, the estimation signals $xe^{(1)}$ to $xe^{(k-1)}$ and $xe^{(k+1)}$ to $xe^{(N)}$, and a submatrix $H^{(k,p)}$ (wherein, p is a variable number representing an integer that is equal to or larger than 1, that is equal to or smaller than N and that is different from the variable number k), the submatrix $H^{(k,p)}$ is a part of a transmission path matrix H that indicates a state of a transmission path between the transmission apparatus and the reception apparatus, and the submatrix $H^{(k,p)}$ includes a matrix component corresponding to the reception signal component $y^{(k)}$ but does not include a matrix component corresponding to the transmission signal component $x^{(k)}$, after the first operation is performed;

perform a third operation that re-estimates, by using the signal estimation method that is specified by the set parameter, the estimation signal $xe^{(k)}$ by updating the estimation signal $xe^{(k)}$ on the basis of the correction signal $ya^{(k)}$, the internal data $v^{(k)}$ and $z^{(k)}$, and a submatrix $H^{(k,k)}$, the submatrix $H^{(k,k)}$ is a part of the transmission path matrix H and includes a matrix component corresponding to the reception signal $y^{(k)}$ and the transmission signal $x^{(k)}$, after the second operation is performed; and output one signal component candidate that is the closest to the estimation signal $xe^{(k)}$ from a plurality of signal component candidates that can be taken by the transmission signal component $x^{(k)}$ after the second and third operations are repeated R times (wherein R is a constant number representing an integer that is equal to or larger than 2), the controller is configured to generate the correction signal $ya^{(k)}$ on the basis of the estimation signals $xe^{(1)}$ to $xe^{(k-1)}$ and $xe^{(k+1)}$ to $xe^{(N)}$ that are estimated by the third operation performed "r−1"-th time when the second operation is performed r-th time (wherein r is a variable number representing an integer that is equal to or larger than 1 and that is equal to or smaller than R).

[Supplementary Note 5]

The signal estimation apparatus according to claim 1, wherein in order to estimate, from the reception signal component $y^{(k)}$ that is classified into a k-th (wherein, k is a variable number representing an integer that is equal to or larger than 1 and that is equal to or smaller than N, and N is a constant number that indicates the number of the signal group and that is equal to or larger than 2) signal group of the plurality of signal groups, the estimation signal $xe^{(k)}$ corresponding to the transmission signal component $x^{(k)}$ that is classified into the k-th signal group, the controller is controlled to:

perform a first operation that initializes internal data $v^{(1)}$ to $v^{(N)}$ and $z^{(1)}$ to $z^{(N)}$, which are used to estimate the estimation signals $xe^{(1)}$ to $xe^{(N)}$, respectively, and the estimation signals $xe^{(1)}$ to $xe^{(N)}$;

perform a second operation that repeats a predetermined processing N times while updating the variable number k from 1 to N after the first operation is performed, the predetermined processing including a generation processing that generates, by using the signal estimation method that is specified by the set parameter, a correction signal $ya^{(k)}$ that is a corrected value of the reception signal component $y^{(k)}$ on the basis of the reception signal component $y^{(k)}$, the estimation signals $xe^{(1)}$ to $xe^{(k-1)}$ and $xe^{(k+1)}$ to $xe^{(N)}$, and a submatrix $H^{(k,p)}$ (wherein, p is a variable number representing an integer that is equal to or larger than 1, that is equal to or smaller than N and that is different from the variable number k), the submatrix $H^{(k,p)}$ is a part of a transmission path matrix H that indicates a state of a transmission path between the transmission apparatus and the reception apparatus, and the submatrix $H^{(k,p)}$ includes a matrix component corresponding to the reception signal component $y^{(k)}$ but does not include a matrix component corresponding to the transmission signal component $x^{(k)}$, and an estimation processing that re-estimates, by using the signal estimation method that is specified by the set parameter, the estimation signal $xe^{(k)}$ by updating the estimation signal $xe^{(k)}$ on the basis of the correction signal $ya^{(k)}$, the internal data $v^{(k)}$ and $z^{(k)}$, and a submatrix $H^{(k,k)}$, the submatrix $H^{(k,k)}$ is a part of the transmission path matrix H and includes a matrix component corresponding to the reception signal component $y^{(k)}$ and the transmission signal component $x^{(k)}$; and output one signal component candidate that is the closest to the estimation signal $xe^{(k)}$ from a plurality of signal component candidates that can be taken by the transmission signal component $x^{(k)}$ after the second operation is repeated R times (wherein R is a constant number representing an integer that is equal to or larger than 2), the controller is configured to generate the correction signal $ya^{(k)}$ on the basis of the estimation signals $xe^{(k+1)}$ to $xe^{(N)}$ that are estimated by the "k+1"-th to N-th predetermined processing in the second operation performed "r−1"-th time and the estimation signals $xe^{(1)}$ to $xe^{(k-1)}$ that are estimated by the first to "k−1"-th predetermined processing in the second operation performed r-th time when the k-th predetermined processing is performed in the second operation performed r-th time (wherein r is a variable number representing an integer that is equal to or larger than 1 and that is equal to or smaller than R).

[Supplementary Note 6]

The signal estimation apparatus according to claim 1, wherein the transmission antenna is an antenna in which M transmission array antennas are concentrically arranged (wherein M is an integer that is equal to or larger than 1), each transmission array antenna includes N transmission antenna elements arranged at equal intervals in a circular (wherein N is a constant number representing an integer that is equal to or larger than 2), the reception antenna is an antenna in which M reception array antennas are concentrically arranged, each reception array antenna includes N reception antenna elements arranged at equal intervals in a circular.

[Supplementary Note 7]

The signal estimation apparatus according to claim 1, wherein the transmission antenna is an antenna in which M transmission array antennas are linearly arranged (wherein M is an integer that is equal to or larger than 1), each transmission array antenna includes N transmission antenna elements arranged at equal intervals in a circular (wherein N is a constant number representing an integer that is equal to or larger than 2), the reception antenna is an antenna in which M reception array antennas are linearly arranged, each reception array antenna includes N reception antenna elements arranged at equal intervals in a circular.

[Supplementary Note 8]

The signal estimation apparatus according to claim 1, wherein the reception apparatus includes a converter that performs, as the reception processing, a discrete Fourier transform processing on the plurality of reception signal components by a unit of predetermined number of reception signal component, the controller is configured to estimate the estimation signal from the reception signal on which the discrete Fourier transform processing is performed.

[Supplementary Note 9]

The signal estimation apparatus according to claim 1, wherein the learning operation includes an operation that updates the parameter on the basis of a learning data including a sample value of the transmission signal and a sample value of the reception signal so that a loss function relating to a difference between the sample value of the transmission signal and the estimation signal that is estimated on the basis of the sample value of the reception signal and the signal estimation method.

[Supplementary Note 10]

A signal estimation method that estimates a transmission signal from a reception signal in a communication system,
   the communication system including:
   a transmission apparatus that transmits the transmission signal by using a transmission antenna including a plurality of transmission antenna elements; and
   a reception apparatus that receives, as the reception signal, the transmission signal transmitted by the transmission apparatus by using a reception antenna including a plurality of reception antenna elements,
   the signal estimation method comprising:
   classifying a plurality of reception signal components that are included in the reception signal and that are received by the plurality of reception antenna elements, respectively, and a plurality of transmission signal components that are included in the transmission signal and that are transmitted by the plurality of transmission antenna elements, respectively, into a plurality of signal groups that are determined in accordance with a degree of a correlation between the reception signal component and the transmission signal component, on the basis of system information that includes antenna information relating to the transmission antenna and the reception antenna, a distance information relating to a transmission distance between the transmission antenna and the reception antenna, a carrier wave information relating to carrier wave used by the communication system and processing information relating to a signal processing performed by the transmission apparatus and a reception processing performed by the reception apparatus;
   setting, for each signal group, a parameter that specifies a content of the signal estimation method to be either one of a learned value that is learnable by a learning operation and a fixed value that is independent from the learning operation; and
   estimating, for each signal group, an estimation signal that is an estimated value of the transmission signal from the reception signal by using the signal estimation method that is specified by the set parameter.

[Supplementary Note 11]

A non-transitory program recording medium on which a computer program that allows a computer to execute a signal estimation method is recorded,
   the signal estimation method is a method that estimates a transmission signal from a reception signal in a communication system,
   the communication system including:
   a transmission apparatus that transmits the transmission signal by using a transmission antenna including a plurality of transmission antenna elements; and
   a reception apparatus that receives, as the reception signal, the transmission signal transmitted by the transmission apparatus by using a reception antenna including a plurality of reception antenna elements,
   the signal estimation method comprising:
   classifying a plurality of reception signal components that are included in the reception signal and that are received by the plurality of reception antenna elements, respectively, and a plurality of transmission signal components that are included in the transmission signal and that are transmitted by the plurality of transmission antenna elements, respectively, into a plurality of signal groups that are determined in accordance with a degree of a correlation between the reception signal component and the transmission signal component, on the basis of system information that includes antenna information relating to the transmission antenna and the reception antenna, a distance information relating to a transmission distance between the transmission antenna and the reception antenna, a carrier wave information relating to carrier wave used by the communication system and processing information relating to a signal processing performed by the transmission apparatus and a reception processing performed by the reception apparatus;
   setting, for each signal group, a parameter that specifies a detail of the signal estimation method to be either one of a learned value that is learnable by a learning operation and a fixed value that is independent from the learning operation; and
   estimating, for each signal group, an estimation signal that is an estimated value of the transmission signal from the reception signal by using the signal estimation method that is specified by the set parameter.

The present invention is not limited to the above-described examples and is allowed to be changed, if desired, without departing from the essence or spirit of the invention which can be read from the claims and the entire specification. A signal estimation apparatus, a signal estimation method, a computer program, a computer program product and a program recording medium, which involve such changes, are also intended to be within the technical scope of the present invention.

DESCRIPTION OF REFERENCE NUMERALS

1 Transmission apparatus
11 Signal processing apparatus
2 Reception apparatus
21 Signal processing apparatus
211 Transform unit
212 Signal estimation unit
213 Parameter set unit
SYS Communication system
x Transmission signal
y Reception signal

What is claimed is:

1. A signal estimation apparatus that estimates a transmission signal from a reception signal in a communication system,
   the communication system including:
   a transmission apparatus that transmits the transmission signal by using a transmission antenna including a plurality of transmission antenna elements; and
   a reception apparatus that receives, as the reception signal, the transmission signal transmitted by the transmission apparatus by using a reception antenna including a plurality of reception antenna elements,
   the signal estimation apparatus comprising a controller,
   the controller being configured to:
   classify a plurality of reception signal components that are included in the reception signal and that are received by the plurality of reception antenna elements, respectively, and a plurality of transmission signal components that are included in the transmission signal and that are transmitted by the plurality of transmission antenna elements, respectively, into a plurality of signal groups in accordance with a degree of a correlation between the reception signal component and the transmission signal component, on the basis of system information that includes antenna information relating to the transmission antenna and the reception antenna, a distance information relating to a transmission distance between the transmission antenna and the reception antenna, a carrier wave information relating to carrier wave used by the communication system and processing information relating to a signal processing performed by the transmission apparatus and a reception processing performed by the reception apparatus;

set, for each signal group, a parameter that specifies a detail of a signal estimation method to be either one of a learned value that is learnable by a learning operation and a fixed value that is independent from the learning operation; and estimate, for each signal group, an estimation signal that is an estimated value of the transmission signal from the reception signal by using the signal estimation method that is specified by the set parameter.

2. The signal estimation apparatus according to claim 1, wherein
the controller is configured to:
estimate a transmission path matrix that indicates a state of a transmission path between the transmission apparatus and the reception apparatus on the basis of the system information;
classify the plurality of reception signal components and the plurality of transmission signal components into the plurality of signal groups by using a magnitude of an absolute value of each matrix component of the transmission path matrix as the degree of the correlation between one reception signal component and one transmission signal component each of which corresponds to each matrix component;
calculate (i) a first communication capacity that indicates an amount of information that is transmittable when each transmission signal component is estimated from the plurality of reception signal components, (ii) a second communication capacity that indicates a theoretical value of an amount of information that is transmittable when each transmission signal component is estimated from at least one reception signal component that has been classified into a signal group having the same index as a signal group into which each transmission signal component has been classified and (iii) a third communication capacity that indicates an amount of information that is transmittable when each transmission signal component is estimated from at least one reception signal component that has been classified into a signal group having the same index as a signal group into which each transmission signal component by using another signal estimation method that is different from the signal estimation method used by the controller, on the basis of the transmission path matrix and a classified result of the plurality of signal groups; and
set the parameter to be either one of the learned value and the fixed value on the basis of a magnitude relationship among the first to third communication capacities.

3. The signal estimation apparatus according to claim 2, wherein
the controller is configured to set each of a plurality of parameters to be either one of the learned value and the fixed value.
the controller is configured to set a first parameter of the plurality of parameters to be the fixed value when the first communication capacity is equal to the second communication capacity, and set the first parameter to be the learned value when the first communication capacity is not equal to the second communication capacity,
the controller is configured to set a second parameter of the plurality of parameters, which is different from the first parameter, to be the fixed value when the second communication capacity is equal to the third communication capacity, and set the second parameter to be the learned value when the second communication capacity is not equal to the third communication capacity.

4. The signal estimation apparatus according to claim 1, wherein
in order to estimate, from the reception signal component $y^{(k)}$ that is classified into a k-th (wherein, k is a variable number representing an integer that is equal to or larger than 1 and that is equal to or smaller than N, and N is a constant number that indicates the number of the signal group and that is equal to or larger than 2) signal group of the plurality of signal groups, the estimation signal $xe^{(k)}$ corresponding to the transmission signal component $x^{(k)}$ that is classified into the k-th signal group, the controller is controlled to:
perform a first operation that initializes internal data $v^{(k)}$ and $z^{(k)}$, which are used to estimate the estimation signal $xe^{(k)}$, and the estimation signal $xe^{(k)}$;
perform a second operation that generates, by using the signal estimation method that is specified by the set parameter, a correction signal $ya^{(k)}$ that is a corrected value of the reception signal component $y^{(k)}$ on the basis of the reception signal component $y^{(k)}$, the estimation signals $xe^{(1)}$ to $xe^{(k-1)}$ and $xe^{(k+1)}$ to $xe^{(N)}$, and a submatrix $H^{(k,p)}$ (wherein, p is a variable number representing an integer that is equal to or larger than 1, that is equal to or smaller than N and that is different from the variable number k), the submatrix $H^{(k,p)}$ is a part of a transmission path matrix H that indicates a state of a transmission path between the transmission apparatus and the reception apparatus, and the submatrix $H^{(k,p)}$ includes a matrix component corresponding to the reception signal component $y^{(k)}$ but does not include a matrix component corresponding to the transmission signal component $x^{(k)}$, after the first operation is performed;
perform a third operation that re-estimates, by using the signal estimation method that is specified by the set parameter, the estimation signal $xe^{(k)}$ by updating the estimation signal $xe^{(k)}$ on the basis of the correction signal $ya^{(k)}$, the internal data $v^{(k)}$ and $z^{(k)}$, and a submatrix $H^{(k,k)}$, the submatrix $H^{(k,k)}$ is a part of the transmission path matrix H and includes a matrix component corresponding to the reception signal $y^{(k)}$ and the transmission signal $x^{(k)}$, after the second operation is performed; and
output one signal component candidate that is the closest to the estimation signal $xe^{(k)}$ from a plurality of signal component candidates that can be taken by the transmission signal component $x^{(k)}$ after the second and third operations are repeated R times (wherein R is a constant number representing an integer that is equal to or larger than 2),
the controller is configured to generate the correction signal $ya^{(k)}$ on the basis of the estimation signals $xe^{(1)}$ to $xe^{(k-1)}$ and $xe^{(k+1)}$ to $xe^{(N)}$ that are estimated by the third operation performed "r−1"-th time when the second operation is performed r-th time (wherein r is a variable number representing an integer that is equal to or larger than 1 and that is equal to or smaller than R).

5. The signal estimation apparatus according to claim 1, wherein in order to estimate, from the reception signal component $y^{(k)}$ that is classified into a k-th (wherein, k is a variable number representing an integer that is equal to or larger than 1 and that is equal to or smaller than N, and N is a constant number that indicates the number of the signal group and that is equal to or larger than 2) signal group of the plurality of signal groups, the estimation signal $xe^{(k)}$ corresponding to the transmission signal component $x^{(k)}$ that is classified into the k-th signal group, the controller is controlled to:

perform a first operation that initializes internal data $v^{(1)}$ to $v^{(N)}$ and $z^{(1)}$ to $z^{(N)}$, which are used to estimate the estimation signals $xe^{(1)}$ to $xe^{(N)}$, respectively, and the estimation signals $xe^{(1)}$ to $xe^{(N)}$;

perform a second operation that repeats a predetermined processing N times while updating the variable number k from 1 to N after the first operation is performed, the predetermined processing including a generation processing that generates, by using the signal estimation method that is specified by the set parameter, a correction signal $ya^{(k)}$ that is a corrected value of the reception signal component $y^{(k)}$ on the basis of the reception signal component $y^{(k)}$, the estimation signals $xe^{(1)}$ to $xe^{(k-1)}$ and $xe^{(k+1)}$ to $xe^{(N)}$, and a submatrix $H^{(k,p)}$ (wherein, p is a variable number representing an integer that is equal to or larger than 1, that is equal to or smaller than N and that is different from the variable number k), the submatrix $H^{(k,p)}$ is a part of a transmission path matrix H that indicates a state of a transmission path between the transmission apparatus and the reception apparatus, and the submatrix $H^{(k,p)}$ includes a matrix component corresponding to the reception signal component $y^{(k)}$ but does not include a matrix component corresponding to the transmission signal component $x^{(k)}$, and an estimation processing that re-estimates, by using the signal estimation method that is specified by the set parameter, the estimation signal $xe^{(k)}$ by updating the estimation signal $xe^{(k)}$ on the basis of the correction signal $ya^{(k)}$, the internal data $v^{(k)}$ and $z^{(k)}$, and a submatrix $H^{(k,k)}$, the submatrix $H^{(k,k)}$ is a part of the transmission path matrix H and includes a matrix component corresponding to the reception signal component $y^{(k)}$ and the transmission signal component $x^{(k)}$; and output one signal component candidate that is the closest to the estimation signal $xe^{(k)}$ from a plurality of signal component candidates that can be taken by the transmission signal component $x^{(k)}$ after the second operation is repeated R times (wherein R is a constant number representing an integer that is equal to or larger than 2), the controller is configured to generate the correction signal $ya^{(k)}$ on the basis of the estimation signals $xe^{(k+1)}$ to $xe^{(N)}$ that are estimated by the "k+1"-th to N-th predetermined processing in the second operation performed "r−1"-th time and the estimation signals $xe^{(1)}$ to $xe^{(k-1)}$ that are estimated by the first to "k−1"-th predetermined processing in the second operation performed r-th time when the k-th predetermined processing is performed in the second operation performed r-th time (wherein r is a variable number representing an integer that is equal to or larger than 1 and that is equal to or smaller than R).

6. The signal estimation apparatus according to claim 1, wherein the transmission antenna is an antenna in which M transmission array antennas are concentrically arranged (wherein M is an integer that is equal to or larger than 1), each transmission array antenna includes N transmission antenna elements arranged at equal intervals in a circular (wherein N is a constant number representing an integer that is equal to or larger than 2), the reception antenna is an antenna in which M reception array antennas are concentrically arranged, each reception array antenna includes N reception antenna elements arranged at equal intervals in a circular.

7. The signal estimation apparatus according to claim 1, wherein the transmission antenna is an antenna in which M transmission array antennas are linearly arranged (wherein M is an integer that is equal to or larger than 1), each transmission array antenna includes N transmission antenna elements arranged at equal intervals in a circular (wherein N is a constant number representing an integer that is equal to or larger than 2), the reception antenna is an antenna in which M reception array antennas are linearly arranged, each reception array antenna includes N reception antenna elements arranged at equal intervals in a circular.

8. The signal estimation apparatus according to claim 1, wherein the reception apparatus includes a converter that performs, as the reception processing, a discrete Fourier transform processing on the plurality of reception signal components by a unit of predetermined number of reception signal component, the controller is configured to estimate the estimation signal from the reception signal on which the discrete Fourier transform processing is performed.

9. The signal estimation apparatus according to claim 1, wherein the learning operation includes an operation that updates the parameter on the basis of a learning data including a sample value of the transmission signal and a sample value of the reception signal so that a loss function relating to a difference between the sample value of the transmission signal and the estimation signal that is estimated on the basis of the sample value of the reception signal and the signal estimation method.

10. A signal estimation method that estimates a transmission signal from a reception signal in a communication system, the communication system including:

a transmission apparatus that transmits the transmission signal by using a transmission antenna including a plurality of transmission antenna elements; and a reception apparatus that receives, as the reception signal, the transmission signal transmitted by the transmission apparatus by using a reception antenna including a plurality of reception antenna elements, the signal estimation method comprising:

classifying a plurality of reception signal components that are included in the reception signal and that are received by the plurality of reception antenna elements, respectively, and a plurality of transmission signal components that are included in the transmission signal and that are transmitted by the plurality of transmission antenna elements, respectively, into a plurality of signal groups that are determined in accordance with a degree of a correlation between the reception signal component and the transmission signal component, on the basis of system information that includes antenna information relating to the transmission antenna and the reception antenna, a distance information relating to a transmission distance between the transmission antenna and the reception antenna, a carrier wave information relating to carrier wave used by the communication system and processing information relating to a signal processing performed by the transmission apparatus and a reception processing performed by the reception apparatus;

setting, for each signal group, a parameter that specifies a content of the signal estimation method to be either one of a learned value that is learnable by a learning operation and a fixed value that is independent from the learning operation; and estimating, for each signal group, an estimation signal that is an estimated value of the transmission signal from the reception signal by using the signal estimation method that is specified by the set parameter.

11. A non-transitory program recording medium on which a computer program that allows a computer to execute a signal estimation method is recorded, the signal estimation method being a method that estimates a transmission signal from a reception signal in a communication system, the communication system including:

a transmission apparatus that transmits the transmission signal by using a transmission antenna including a plurality of transmission antenna elements; and a reception apparatus that receives, as the reception signal, the transmission signal transmitted by the transmission apparatus by using a reception antenna including a plurality of reception antenna elements, the signal estimation method comprising:

classifying a plurality of reception signal components that are included in the reception signal and that are received by the plurality of reception antenna elements, respectively, and a plurality of transmission signal components that are included in the transmission signal and that are transmitted by the plurality of transmission antenna elements, respectively, into a plurality of signal groups that are determined in accordance with a degree of a correlation between the reception signal component and the transmission signal component, on the basis of system information that includes antenna information relating to the transmission antenna and the reception antenna, a distance information relating to a transmission distance between the transmission antenna and the reception antenna, a carrier wave information relating to carrier wave used by the communication system and processing information relating to a signal processing performed by the transmission apparatus and a reception processing performed by the reception apparatus;

setting, for each signal group, a parameter that specifies a detail of the signal estimation method to be either one of a learned value that is learnable by a learning operation and a fixed value that is independent from the learning operation; and estimating, for each signal group, an estimation signal that is an estimated value of the transmission signal from the reception signal by using the signal estimation method that is specified by the set parameter.

* * * * *